United States Patent [19]

Chiba et al.

[11] Patent Number: 5,428,553
[45] Date of Patent: Jun. 27, 1995

[54] DIGITAL CONTROL AND PROTECTION EQUIPMENT FOR POWER SYSTEM

[75] Inventors: Tomio Chiba, Katsuta; Mitsuyasu Kido, Hitachi; Tadao Kawai, Katsuta, all of Japan

[73] Assignee: Hitachi, Ltd., Tokyo, Japan

[21] Appl. No.: 482,301

[22] Filed: Feb. 20, 1990

[30] Foreign Application Priority Data

Feb. 22, 1989 [JP] Japan .................. 1-042501

[51] Int. Cl.⁶ ............... H02H 3/00; H02H 3/42
[52] U.S. Cl. .................. 364/492; 395/750; 364/DIG. 1; 364/230; 364/237
[58] Field of Search .......... 371/25.1, 37.1, 53, 371/67.1; 395/750, 200; 364/492, 483, 184; 361/64, 66, 68, 97

[56] References Cited

U.S. PATENT DOCUMENTS

| | | | |
|---|---|---|---|
| 2,969,912 | 1/1961 | Reynolds, Jr. | 371/53 |
| 2,974,865 | 3/1961 | Reimerman et al. | 371/53 |
| 3,017,091 | 3/1961 | Ulrich | 371/53 |
| 3,098,994 | 7/1963 | Brown, Jr. | 371/53 |
| 3,611,289 | 10/1971 | Richards et al. | 371/67.1 |
| 3,889,235 | 6/1975 | Assmus et al. | 371/67.1 |
| 4,108,359 | 8/1978 | Proto | 235/304 |
| 4,142,243 | 2/1979 | Bishop et al. | 395/575 |
| 4,161,027 | 7/1979 | Russell | 364/492 |
| 4,276,645 | 6/1981 | Lacer et al. | 371/36 |
| 4,321,681 | 3/1982 | Sacrin et al. | 364/492 |
| 4,328,551 | 5/1982 | Yamaura et al. | 364/492 |
| 4,333,151 | 6/1982 | Matsushima | 364/492 |
| 4,344,143 | 8/1982 | Kurosawa et al. | 364/492 |
| 4,371,947 | 2/1983 | Fujisawa | 395/750 |
| 4,404,628 | 9/1983 | Angelo | 395/200 |
| 4,466,071 | 8/1984 | Russell, Jr. | 364/492 |
| 4,612,594 | 9/1986 | Yamaoza et al. | 361/68 |
| 4,623,967 | 11/1986 | Naimer | 364/483 |
| 4,628,397 | 12/1986 | Careis et al. | 361/98 |
| 4,635,195 | 1/1987 | Jeppesen, III et al. | 395/750 |
| 4,672,501 | 6/1987 | Bilac et al. | 361/96 |
| 4,677,566 | 6/1987 | Whitianer et al. | 364/492 |
| 4,719,642 | 1/1988 | Lucas | 375/30 |
| 4,774,621 | 9/1988 | Andow | 361/80 |
| 4,803,635 | 2/1989 | Andow | 364/483 |
| 4,858,101 | 8/1989 | Stewart et al. | 364/131 |
| 4,958,345 | 9/1990 | Fujisaki | 371/21.2 |
| 4,972,290 | 11/1990 | Sun et al. | 361/64 |
| 4,996,646 | 2/1991 | Farrington | 364/483 |
| 5,166,887 | 11/1992 | Farrington et al. | 364/483 |
| 5,185,705 | 2/1993 | Farrington | 364/483 |

FOREIGN PATENT DOCUMENTS 0147604 10/1985 European Pat. Off. ....... H02H 3/38

(List continued a next page.)

OTHER PUBLICATIONS

Jeyasurya, B. & Smolinski, W. J. "Design and Testing of Microaccessor-Based Distance Relay," IEEE Transactions on Power Apparatus and Systems, vol. PAS-103, No. 5 (May 1984), pp. 1104–1110.

(List continued a next page.)

Primary Examiner—Dale M. Shaw
Assistant Examiner—Lance Leonard Barry
Attorney, Agent, or Firm—Antonelli, Terry, Stout & Kraus

[57] ABSTRACT

A power signal processing system and method for protection of a power system has a signal input unit for receiving a signal representing a condition of a power system; a plurality of processing units cooperating to apply to the received signal a predetermined process including a series of predetermined different computations thereby producing a control signal for controlling operation of the power signal processing system. The respective processing units operate to perform the predetermined different computations, respectively. A control unit is provided for controlling transfer of data among the processing units so that the different computations are applied, successively, to the received signal thereby producing the control signal which is used to cause, for example, the issue of a cut-off command to a circuit breaker.

5 Claims, 34 Drawing Sheets

FOREIGN PATENT DOCUMENTS

| | | | |
|---|---|---|---|
| 0162185 | 11/1985 | European Pat. Off. | H02H 3/04 |
| 0255505 | 3/1988 | European Pat. Off. | H02H 3/00 |
| 3132730 | 8/1981 | Germany | H02H 7/26 |
| 60-84912 | 5/1985 | Japan | H02H 3/02 |
| 776779 | 6/1957 | United Kingdom | 371/53 |
| 831714 | 8/1958 | United Kingdom | 371/53 |
| 2047995 | 12/1980 | United Kingdom | H02H 1/00 |

OTHER PUBLICATIONS

St-Jacques, A. L. & Santarre, G. "A Multiprocessor-Based Distance Relay Design Features and Test Results." IEEE Transactions in Power Apparatus and Systems, vol. PAS-102, No. 12 (Dec. 1983) pp. 3842-3848.

Mauk, O. P. & Hope, G. S. "Design Concepts for a Distributed Microaccessor-Based Transmission Line Control and Monitoring System" in: Akashi, H. Control Science and Technology for the Progress of Society (Oxford, Pergamon, 1981) pp. 1721-1725.

Retus, A., Landis & Gyr "A Recent Development in the Field of Protective Relaying".

Journal of the Institute of Electrical Engineers of Japan, vol. 105, No. 12, p. 12.

1986 National Conference Report No. 1319 of the Institute of Electrical Engineers of Japan.

Martin, *Local Area Networks* (1984) ch. 1. & pp. 43-45.

Ludeman, *Fundamentals of DSP* (1986) pp. 1-17.

Sargent, *The IBM PC* (1986) pp. 159-160, §6-1, p. 357.

Carlson, *Communication systems* (1986) §8.2, 8.3.

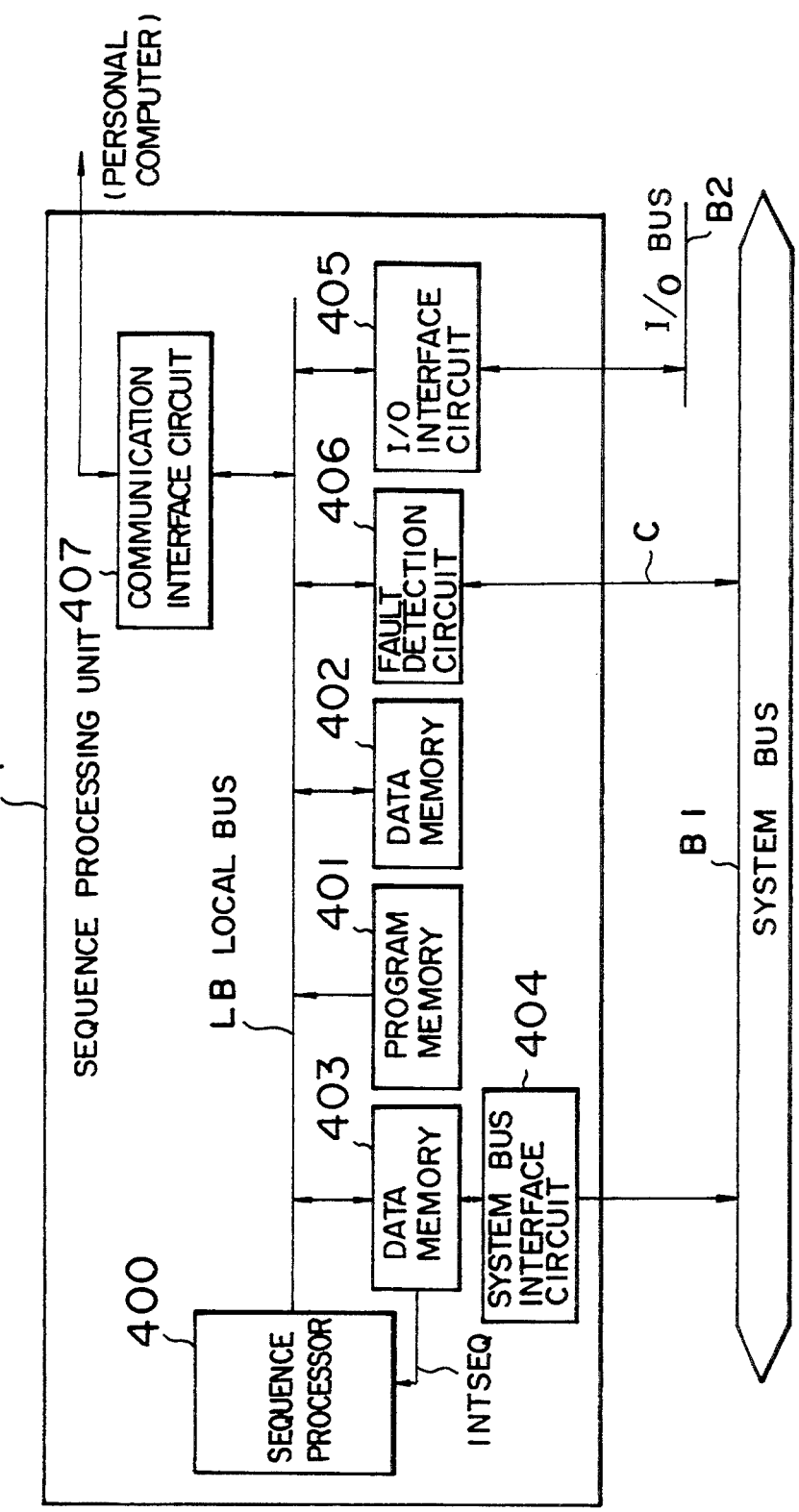

FILTER A

FILTER B in

Tin

LPF out

FILTER
OUTPUT A

FILTER
OUTPUT B

ABSOLUTE
VALUE
OUTPUT

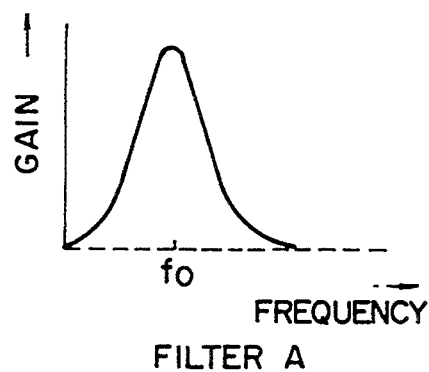
FIG. 24A
FILTER A
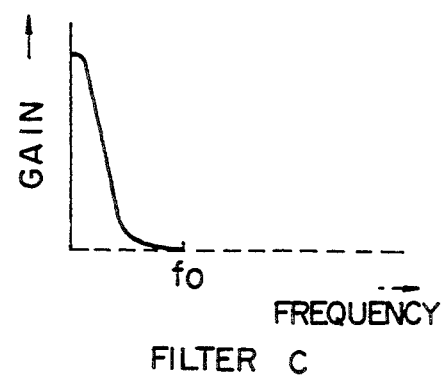
FIG. 24B
FILTER C
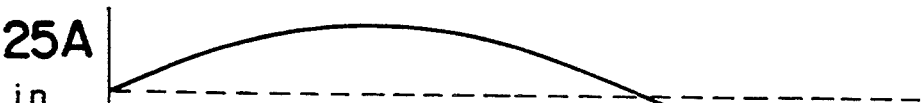
FIG. 25A
in
FIG. 25B
Tin'
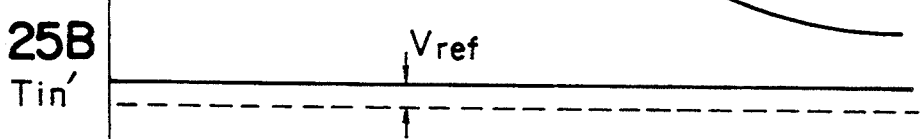
FIG. 25C
LPF out
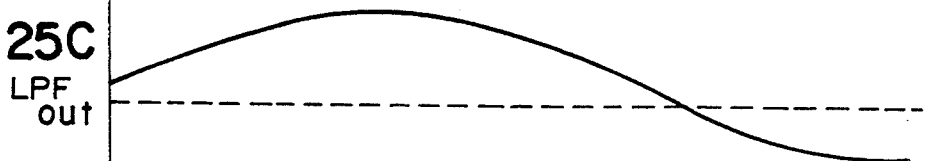
FIG. 25D
FILTER OUTPUT A
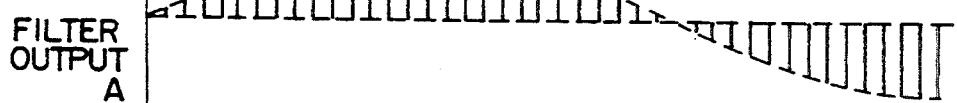
FIG. 25E
FILTER OUTPUT C
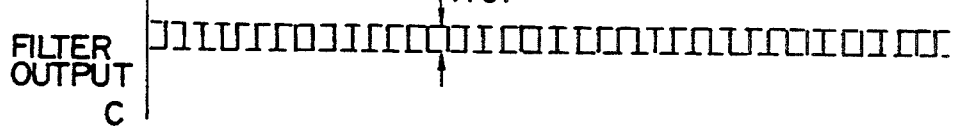

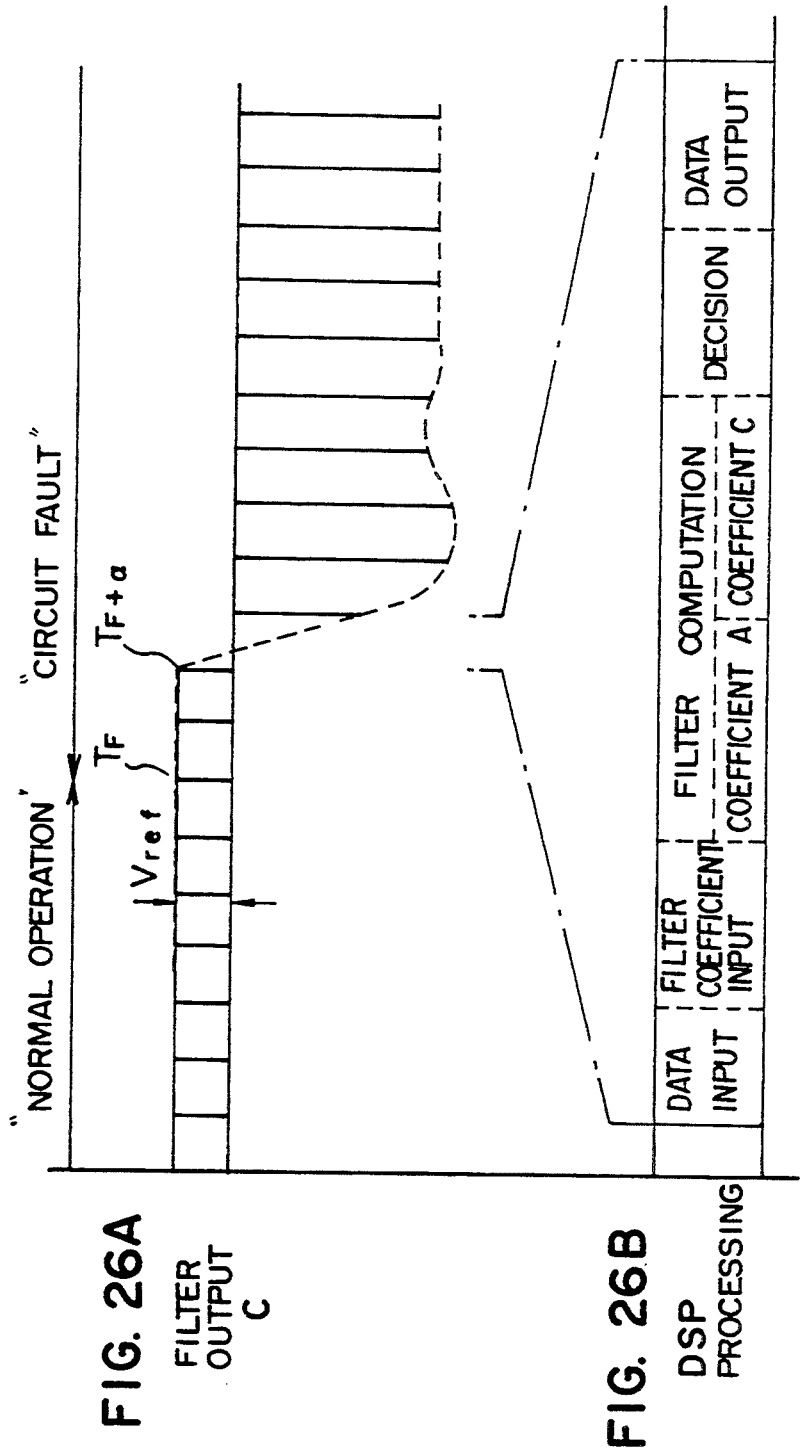

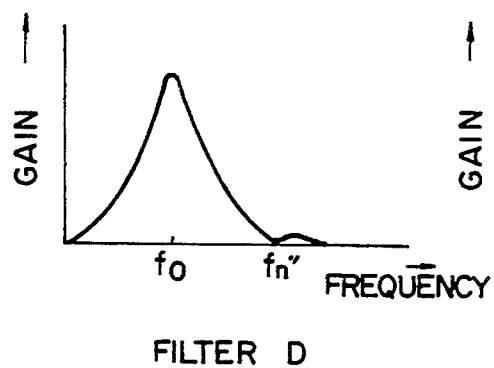
FIG. 27A
FILTER D
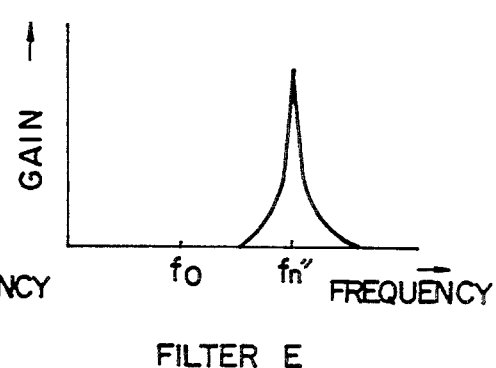
FIG. 27B
FILTER E
FIG. 28A
S/H SIGNAL
FIG. 28B
Ti INPUT SIGNAL
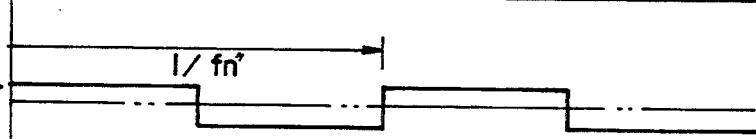
$1/f_n'$
FIG. 28C
FILTER OUTPUT E
FIG. 28D
TIME
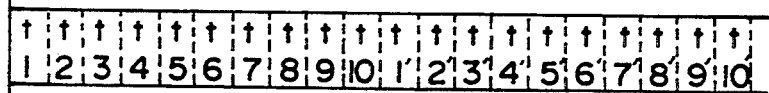

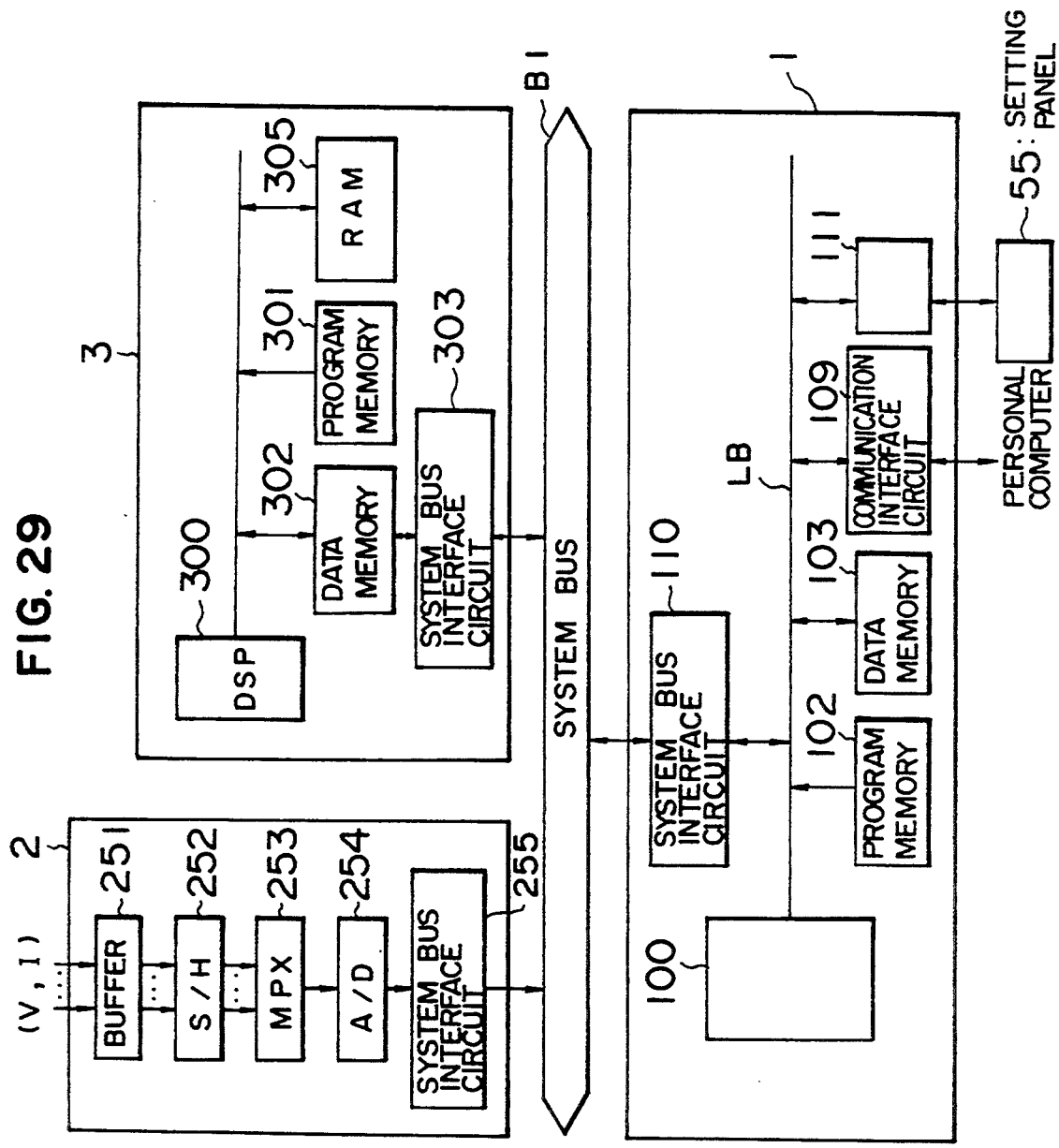

FIG. 32

| STANDARD FORMULA | $\sum_{n=1}^{N}\{(k_1 \cdot I \cdot Z_1 - k_2 \cdot V)(k_3 \cdot V - k_4 \cdot I \cdot Z_2)\} > k_5 \cdot K$ | | | | | |
|---|---|---|---|---|---|---|
| NO | REALIZABLE RELAY | EQUIVALENT COMPUTATION FORMULA | $k_1$ | $k_2$ | $k_3$ | $k_4$ | $k_5$ |
| 1 | REACTANCE RELAY | $\sum\{(I \cdot Z_1 - V) \cdot (I \cdot Z_1)\} > K$ | 1 | 1 | 0 | -1 | - |
| 2 | MHO RELAY | $\sum\{(I \cdot Z_1 - V) \cdot V\} > K$ | 1 | 1 | 1 | 0 | - |
| 3 | OFFSET MHO RELAY | $\sum\{(I \cdot Z_1 - V) \cdot (V - I \cdot Z_2)\} > K$ | 1 | 1 | 1 | 1 | - |

FIG. 35

| | |
|---|---|
| $k_1 = 1$ | |
| $k_2 = 1$ | |
| $k_3 = 0$ | COEFFICIENT OF REACTANCE RELAY |
| $k_4 = -1$ | |
| $k_5 = 1$ | |
| $V_a$ | PHASE A INPUT DATA |
| $I_a$ | |
| $V_b$ | PHASE B INPUT DATA |
| $I_b$ | |
| $V_c$ | PHASE C INPUT DATA |
| $I_c$ | |
| $Z_1 = Z_{sx1}$ | SET VALUE FOR STAGE 1 |
| $Z_2 = Z_{sx1}$ | |
| $Z_1 = Z_{sx2}$ | SET VALUE FOR STAGE 2 |
| $Z_2 = Z_{sx2}$ | |
| $Z_1 = Z_{sx3}$ | SET VALUE FOR STAGE 3 |
| $Z_2 = Z_{sx3}$ | |

DIGITAL CONTROL AND PROTECTION EQUIPMENT FOR POWER SYSTEM

BACKGROUND OF THE INVENTION

The present invention relates to a power signal processing system suitably used with a power protection system or a control system of a power transmission and distribution system, including a power system and a distribution system, and more particularly to a power signal processing system and a related system, based on a multiprocessor system, with processing means optimally distributed into a plurality of units according to respective processing functions.

The present invention also relates to a protective relay system for a power system, comprising a plurality of units optimally distributed according to respective processing functions, and more in particular to standardization of software for a digital protective relay operation.

(1) In recent years, a digital relay has been developed as a protective relay for a power system to process voltage or current signal data sampled at regular time intervals, detect a system fault and thus to protect the system.

A conventional digital relay of this type, as disclosed in the Journal of the Institute of Electrical Engineers of Japan, Vol. 105, No. 12, p. 12, infra, comprises an input section, a processing section, a setting section and an output section. The input section of this relay includes a filter, a sample-hold circuit, a multiplexer, an analog-digital converter and a buffer. Also, the processing section includes a CPU (microprocessor), a RAM and a ROM for relay computation. In this case, a plurality of relay functions are executed by the CPU in a time division multiplexing mode.

In another similar digital relay system, current and voltage signals are supplied from a current transformer CT, a transformer PT and the like arranged on a transmission line L, and these signals undergo computations according to a predetermined algorithm, thereby to monitor the system for an accident. If an accident, such as grounding, occurs in the transmission line L, this system receives the resulting variations in current and voltage signals, makes a computation on the basis of these signals, pinpoints the position of the fault, and produces a signal for tripping a circuit breaker at an optimal position.

A higher-graded protective performance, higher speed and greater accuracy are now required in order to meet the more and more complicated phenomena of system accidents. A multitude of data are required to be processed at high speed according to various algorithms.

The above-mentioned type of digital relay, however, is limited in the processing ability of the processing section thereof, and is hardly able to meet the great data processing requirements. An unavoidable measure is to arrange a plurality of digital relays in juxtaposition, thus posing the problem of a generally bulky system configuration.

Such a system, being an assemblage of a plurality of independently-functioning digital relays, is not easily able to secure cooperation among the relays. For example, it is difficult for the relays to share the results of operation. Separate executions of operations are unavoidable for the respective relays, thus leading to the problem of low operating efficiency.

A multiprocessor system for executing the operations of a plurality of microprocessors has also been suggested.

In this type of system, as disclosed in JP-A-60-84912, the protective operation is divided into a plurality of individual processing operations for protective relay elements, respectively, which individual processing operations are executed by independent operation modules connected by a serial data transmission line. Each operation module receives only the data required by itself as an input, and after accomplishing an assigned operation, transmits its output to the serial data transmission line.

Another digital protective relay system for power applications is disclosed in the 1986 National Conference Report No. 1319 of the Institute of Electrical Engineers of Japan. In this system, the functions related to the protective relay are divided into a plurality of units respectively packaged on different printed boards, which are connected through a system bus. The units are divided according to the required functions into analog input, computation, setting, accident detection, power supply, input converter, indication, output, input and auxiliary relay sections.

Of all the aforementioned conventional systems, the system configured of a plurality of operation modules has the protective operation divided by element, and each protective operation thus divided is processed as a pipeline system separately.

The data transfer by a serial transfer line, however, consumes considerable time, and the requirement of serial-parallel conversion at each module increases the processing overhead. This conventional system, therefore, lacks a sufficient processing ability for a protective relay requiring the real-time processing of a great amount of data. Also, a relay system having a multiplicity of elements requires a multiplicity of processing modules, resulting in a bulky system. The great time taken for data transfer among modules, on the other hand, makes high-speed processing difficult.

The digital relay disclosed in the Journal of the Institute of Electrical Engineers of Japan, in spite of the fact that its protective relay functions are divided into a plurality of units, fails to take into consideration the appropriate control of timings and the like of operation and data transfer between the units.

Specifically, in the case where data transfer is to be executed between a given unit and another unit, each unit is required to secure the right to use the bus and execute the control operation to see whether communications between the units is possible. This not only complicates the control operation, but also requires an additional function of each unit for the particular purpose, thus posing the problem of an increased overhead. In addition, if the bus is occupied by another unit, it is necessary to defer data transfer. This is a problem which is not negligible for a relay system for power applications requiring the processing of a great amount of data in a short time.

Further, these control functions, which are provided for each unit to meet the system configuration and are different from one system to another, are difficult to standardize.

Additionally, in expanding an existing relay system, it is necessary to set the control functions anew for each unit. This renewed setting is effected by rewriting the control program of the microprocessor of each unit, and the rewriting of the control programs of all the microprocessors takes considerable time and labor. Since it is necessary to prepare each control program taking the characteristic difference between the unit functions into consideration, the problem of a narrow capacity of expansion is posed.

Also, the use of a microprocessor in the processing operation imposes a limit on the processing capacity of the unit in high-speed operation. Seeking high speed would sacrifice accuracy, and vice versa. If the processing capacity is to be improved, on the other hand, many units are unavoidably added. Adding units in the system, however, gives rise to various problems as described above.

Another conceivable method of improving the general processing capacity may be to use a plurality of systems in parallel. The scale of the whole system configuration would be increased, accompanied by an increased power consumption and cost. Also, because the smooth cooperation among the systems is not an easy matter, a lower reliability would be unavoidable in the functions requiring the cooperation among parallely-operated systems, thereby making it difficult to realize high functions.

Furthermore, the generally low reliability of the analog input section would make it indispensable to switch the input signal to a check signal for inspecting all the channels at regular intervals of time (say, once every day) in order to improve the data reliability. This requirement is conventionally met by adding a special check circuit. This results in an increased volume of hardware and a complicated software processing, thus providing a bottleneck against an improved reliability.

(2) Another conventional digital relay is disclosed in the Journal of the Institute of Electrical Engineers of Japan (Vol. 105, No. 12, p. 1158 to p. 1160) and Hitachi Hyoron (Vol. 63, No. 4, April 1981, p. 52 infra). This digital relay comprises an input section, a computation processing section, a setting section and an output section. The input section generally has a 12-bit A/D converter, and a 16-bit microprocessor (MPU) is used for processing the relay operation. This MPU is of what is called a fixed point arithmetic type. Also, the software (operation technique) relating to the protective relay operation is realized by time-division multiple processing of the operations of a plurality of types of protective relays (including a reactance relay, a mho relay and an offset relay). The product computation technique is generally used as a computation algorithm as disclosed in the latter publication.

The above-described conventional systems, in which the operation programs relating to a plurality of protective relays are prepared separately from each other, has the problem that a long time is required for preparing operation programs for an inferior software productivity and a great program capacity is required.

This problem is also attributable to the fact that a 16-bit processor of the fixed point arithmetic type is used for the operation and the processing speed for multiplication is low.

In the 16-bit processor of fixed point arithmetic type, the processing for securing a predetermined number of significant digits becomes more complicated with the increase in multiplication commands, and the program is required to be modified depending or the number of relay settings.

Further, the limited program capacity and limited execution time leaves something to be desired with respect to accuracy as the program cannot be prepared with a high accuracy.

SUMMARY OF THE INVENTION

Accordingly, it is an object of the present invention to provide a power signal processing system which is compact and meets various system requirements including expandability, versatility, high functions and multiple functions by unit addition or exchange in order to cover a whole series of equipment, including a transmission line, a bus, a transformer, a power generator, a voltage regulator and a stationary reactive power compensator, covering a wide range of the power system, including voltage classes of 500 kV to 6.6 kV.

Another object of the present invention is to provide a power signal processing system for significantly improving the digital processing capacity of the units (high-speed processing) and for realizing high-speed and high-accuracy processing functions without increasing the system size.

Still another object of the present invention is to provide a compact, reliable and high-performance power signal processing system in which the unit functions are optimally divided and a processor is mounted on each unit for an improved diagnostic function and an improved system reliability is achieved free of the automatic check function with a check input applied by way of an analog input section of the system.

A further object of the present invention is to provide a method of protective relay operation and a protective relay system which obviates the problem specified in (2) above and facilitates the preparation of an operation program for an improved software productivity.

According to one aspect of the present invention, there is provided a power signal processing system in which a series of processing operations from receiving to production of signals based on processing are executed by a plurality of units divided according to respective processing functions, and the data transfer between the units is controlled by a system control unit to execute the series of processing operations by processing functions sequentially.

According to another aspect of the present invention, a digital signal processor is mounted on the high-speed processing unit of all the units for dividing and executing the processing functions, thereby to provide a high-speed processing operation.

According to still another aspect of the present invention, a series of processing functions from the receiving to the production of signals based on the result of processing operations in this power signal processing system are preferably divided into individual units including system control 1, analog input 2, protective operation (relay operation) or control operation 3, sequence processing 4, setting and indication 5, and digital input and output 6. Also, an independently-operable accident detection unit 7 is desirably added to assure a fail-safe function.

These units are preferably configured as follows:
(1) The units 1–5 and 7 have a processor therein.
(2) The units 1–5 are connected through a general-purpose bus, or preferably, a bus of world standard like a multi-bus or VME bus, for example.
(3) The digital input/output unit 6 is connected with the sequence processing unit 4 by way of a bus different from the general-purpose system bus.

(4) The accident detection unit 7 should be arranged in completely separate hardware from the units to 1 to 6 in order to avoid mutual interferences.

Further, in order to achieve the object of high-speed processing, the units 1 to 5 have a processor mounted therein, and the analog input unit 2 and the protective (control) processing unit 3, in particular, have a digital signal processor DSP capable of high-speed processing operations mounted thereon. The other units have a general-purpose microprocessor mounted therein. The units 1 to 5 are adapted for parallel operation. Specifically, the system control unit 1 controls the data to be sequentially transferred to each unit thereby to control the units for performing a series of processing operations in cooperation with each other.

According to another aspect of the present invention, there is provided a power signal processing system in which each processing unit includes a memory enabling the particular processing unit to be accessible to other units, and a data set beforehand is written in this memory by the particular unit or other units periodically, which data is read periodically by another unit, so that it is decided whether the data thus read is the one set beforehand, thereby to monitor the operating conditions of the unit.

Further, in view of the fact that each unit has a processor mounted therein, a fault in a given unit may be detected by self check in addition to the mutual check mentioned above.

Furthermore, a check signal for hardware check may be always superimposed on the analog input signal, and this check signal may be reduced to a value not affecting the system performance by a digital filter, so that the resulting signal component may be extracted by a digital signal processor in the analog input unit, thus checking the normality of the analog input section all the time.

The above-mentioned features of the system configuration lead to the functions and effects of the present invention described below.

The processing functions relating to the protection or control of a power system are realized by appropriately selecting and combining the units 1 to 7. Also, in view of the fact that data transfer between the units is controlled by a system control unit, all that is required in constructing a system is to set a system control unit to meet the system requirement for transfer control and to connect units having the required functions in the required number and order. It is thus possible to standardize the system.

For example, a system having each one of the units 1 to 7 mentioned above may be standardized as a basic system. In the case where a system to be built has many channels of input data, an analog input unit may be added. If such a system has a great processing volume, on the other hand, a computation processing unit may be added to meet the requirements.

The signal processing system according to the present invention, therefore, permits development of a system configuration in a wide variety of applications. It is thus possible to build a system capable of protecting or controlling various objects including the transmission line, transformer, generator and bus in a wide range of voltage classes, such as from 500 kV to 6.6 kV.

Besides, the ease with which the units may be increased or decreased in number or modified results in a compact, reliable digital protection (control) system having multiple functions and high performance. Specifically, a system configuration which is high in versatility and flexibility is produced.

Also, if a digital signal processor (DSP) capable of high-speed computation is mounted in the units 2 and 3, the following advantages are attained.

1) The high-harmonic components generated in the system are removed by a digital filter with DSP, realizing a compact, reliable analog input unit 2 with a performance (accuracy, stability) several times (twice or thrice) higher than in the prior art.

2) The computation relating to the protection or control of the power system is processed within a short time, and a DSP of floating point arithmetic type widens the dynamic range, eliminating the labor which otherwise might be required for scaling or the like. Further, the high processing speed makes possible many (multiple) functions and a high performance operation, thus contributing to an improved performance in control and protection characteristics (high accuracy, and high speed operation), as well as reducing the size and cost with an improved reliability.

In the case of the units 1 to 5, on the other hand, parallel operation free of overhead is made possible by full use of the computation period of a processor mounted therein, and therefore the processing capacity of each unit, that is, the system (throughput) is improved.

In addition, if a high-speed DSP is employed in the unit 1 and high harmonics generated in the power system are eliminated by a digital filter, it is possible to realize a characteristic which is free of characteristic variations of a resistor or a capacitor (high accuracy) and is stable (free of secular variations or the effect of temperature changes) as in a well-known analog filter.

Further, the DSP of the unit 1 reduces the check or monitor signal superimposed on the analog input signal to such a degree as not to adversely affect the performance relating to the protection or control of the power system and at the same time checks the amplitude and frequency of the check and monitor signals constantly. As a result, the conventional method of automatic check in which an analog input signal is switched to a check signal to check for a system fault is eliminated.

Furthermore, a method according to the present invention has a feature in that a plurality of computation formulae relating to a plurality of types of protective relays are standardized into a single formula, and a characteristic constant for the standard formula is set for a predetermined protective relay thereby to execute a predetermined protective relay computation.

A feature of the present invention as a system, on the other hand, resides in the fact that the protective relay computation means is provided for executing a protective relay computation based on a standard formula containing characteristic constants set for a plurality of types of protective relays.

The characteristic constants for the standard formula may be attached to the protective relay computation means as one data. The means for attaching characteristic constants includes a memory for storing characteristic constants, and the protective relay computation means reads the characteristic constants stored in the memory for executing the protective relay computation. Also, if an arrangement is made to write the data in the memory by external input means, the change in setting by on-line or the like means is facilitated.

The present invention configured as described above has the advantages mentioned below.

Specifically, a plurality of computation formulae relating to a plurality of types of protective relays are standardized into a single formula, and a characteristic constant for the standard formula is set variably. Therefore, a plurality of types of protective relays are realized by a single computation program so that the program is very easily prepared, while at the same time greatly reducing the required program capacity. As a consequence, the software productivity is improved, and a protective relay system which is both low in cost and reliable is realized. In addition, the small program capacity permits frequent checking and monitoring of the program, thus making a maintenance-free system possible.

If the protective relay computation is carried out by floating point arithmetic, it is not necessary to change the program in order to secure a significant number of digits depending on the size of the relay set value. Also, the use of a digital signal processor makes possible a very high-speed product computation which in turn makes possible a high-speed processing operation,

BRIEF DESCRIPTION OF THE DRAWINGS

FIG. 12 is a block diagram showing a configuration of a sequence processing unit.

FIGS. 24A and 24B are graphs showing examples of the characteristic of a digital filter.

FIGS. 25–E are waveform diagrams showing an example of waveforms produced at various parts when a second method of automatic check and monitoring is executed for the analog input section.

FIGS. 26A–B are diagrams showing waveforms produced at various parts and the general processing operation of the DSP for explaining the second method of automatic check and monitoring more in detail.

FIGS. 27A and 27B are graphs showing examples of the characteristic of the digital filter.

FIGS. 28A–D are waveform diagrams showing an example of waveforms produced at various parts when a third method of automatic check and monitoring is executed for the analog input section.

FIG. 29 is a diagram showing a general block configuration according to an embodiment of the present invention.

FIG. 32 is a diagram showing the correspondence between a standard formula and various protective relays.

FIG. 35 is a diagram showing the contents of a data memory according to the embodiment shown in FIG. 33.

DESCRIPTION OF THE PREFERRED EMBODIMENTS

Figure 38:
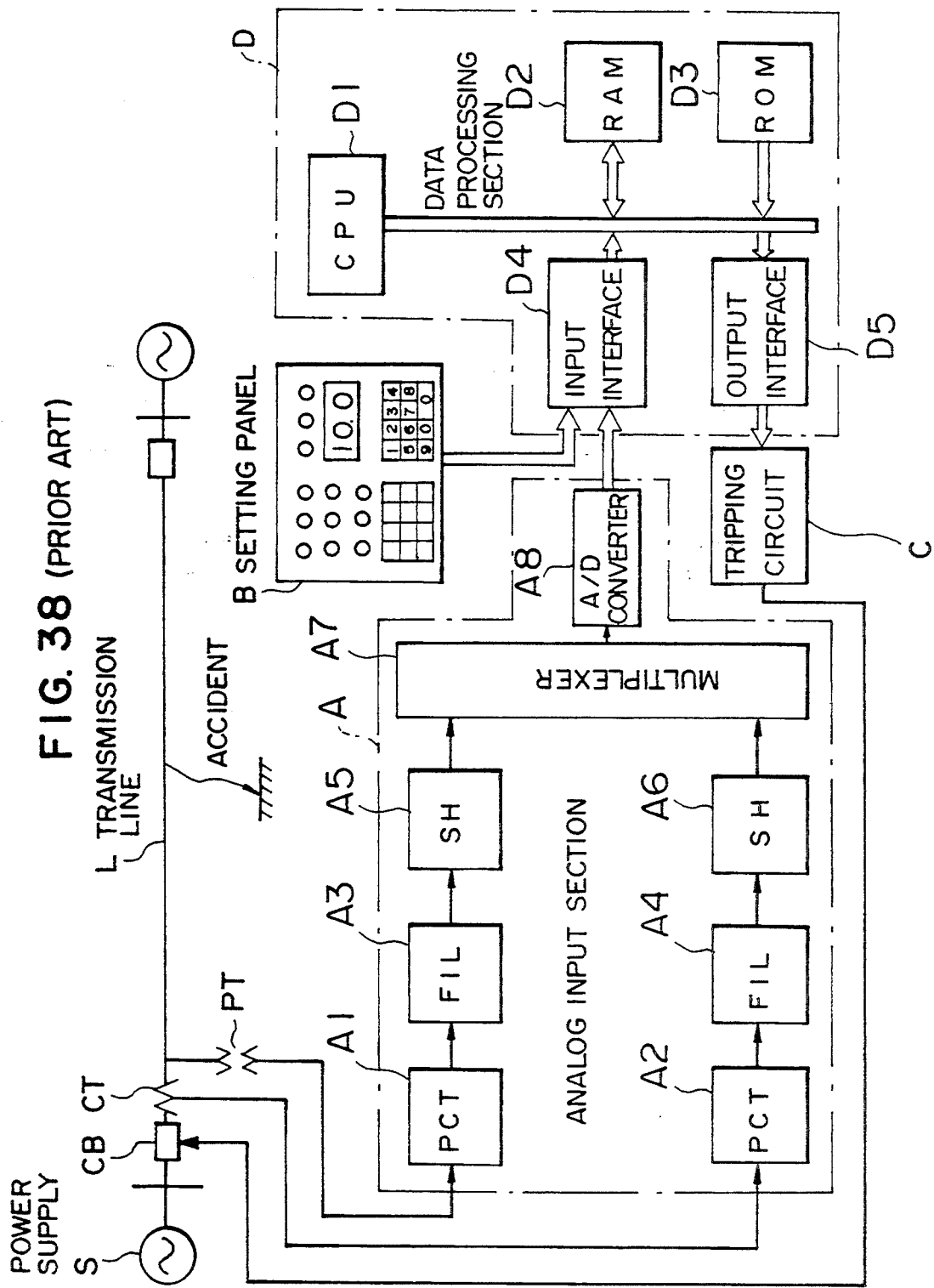
FIG. 38 is a block diagram showing a configuration of a conventional digital relay system.

Prior to explanation of the invention, it will be useful to explain a conventional digital relay system as shown in FIG. 38.

This system comprises an analog input section A, a setting panel B, an output section C and a data processing section D.

The input section A includes auxiliary transformers A1, A2, analog filters A3, A4, sample-hold circuits A5, A6, a multiplexer A7, and an analog-digital converter A8. The output section C includes a trip circuit. The data processing section D includes a central processing unit (CPU) D1 for controlling the internal components of the system and for executing various computations on input data, a RAM D2 making up a work area and a data storage area for the CPU D1, a ROM D3 for storing a control program and an operation program of the CPU D1, an input interface D4 for receiving input signals from the input section A and the setting panel B, and an output interface D5 for applying to the output section a control signal produced as a result of computation.

In contrast to the conventional digital relay system, the digital protective relay system of the present invention is arranged to provide a plurality of units divided according to respective processing functions. Now an embodiment of the present invention will be explained with reference to FIG. 1.

Figure 1:
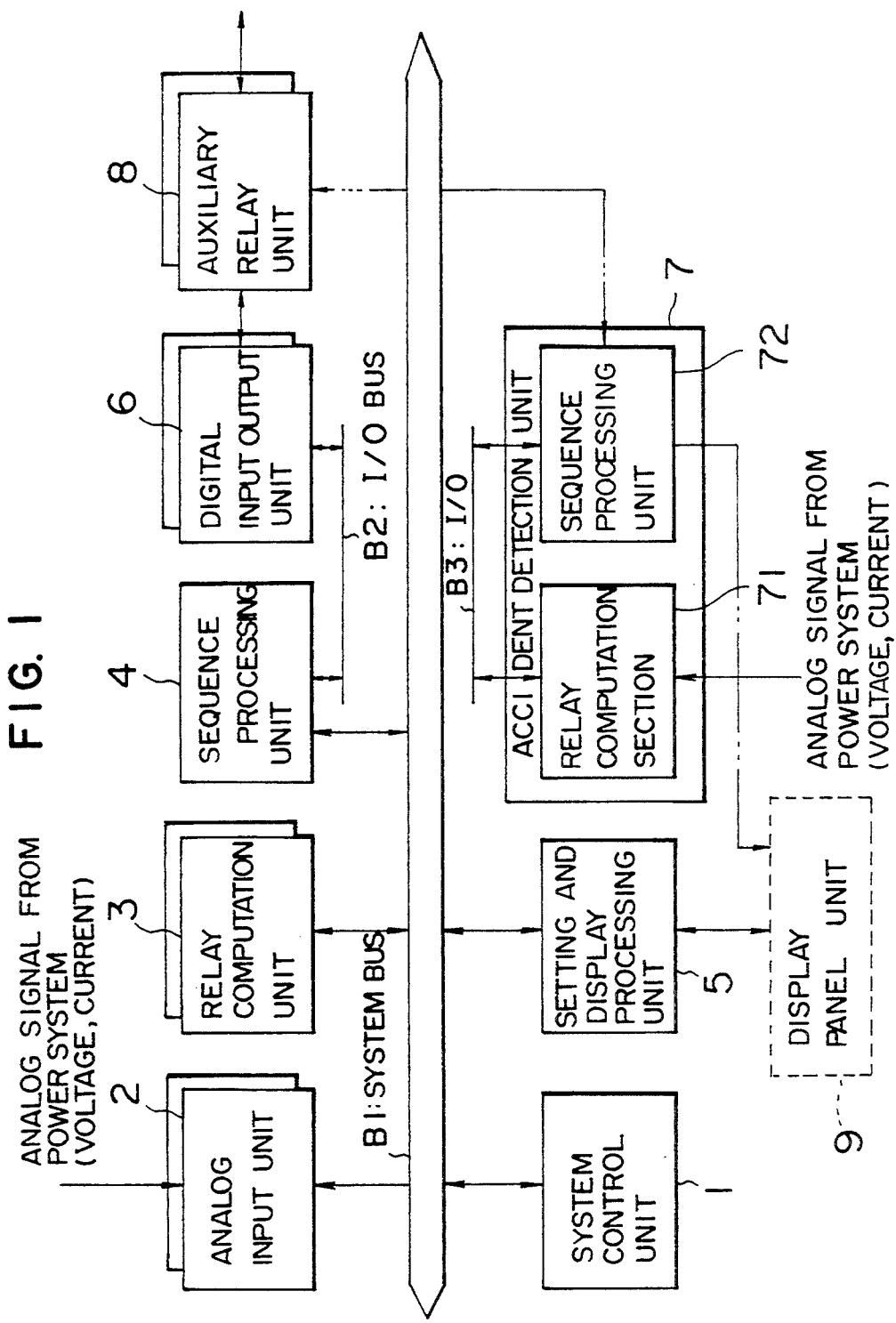
FIG. 1 is a block diagram showing a general configuration of a signal processing system according to an embodiment of the present invention.

FIG. 1 is a diagram showing a general block configuration of a power digital protective relay system applied to a signal processing system according to an embodiment of the present invention.

As shown in the diagram, the present embodiment comprises nine types of units into which the processing functions related to a protective relay are divided. These units are a system control unit 1 for a multiprocessor system, an analog input unit 2 for A/D conversion of an analog input and processing through a digital filter, a relay processing unit 3, a sequence processing unit 4, a setting and display processing unit 5, a digital input/output unit 6, an accident detection unit 7, an auxiliary relay unit 8 and a display panel unit 9.

The units 1 to 5 are connected to each other through a general-purpose bus B1. The sequence processing unit 4 and the digital input/output unit 6 are also connected by an input and output I/O bus B2 different from the general-purpose bus B1.

Further, a sequence processing section 72 and a relay computation section 71 in the accident detection unit 7 are connected by an I/O (input/output) bus B3 different from the buses B1 and B2.

The system also comprises a power unit not shown for driving the units.

Figure 2:
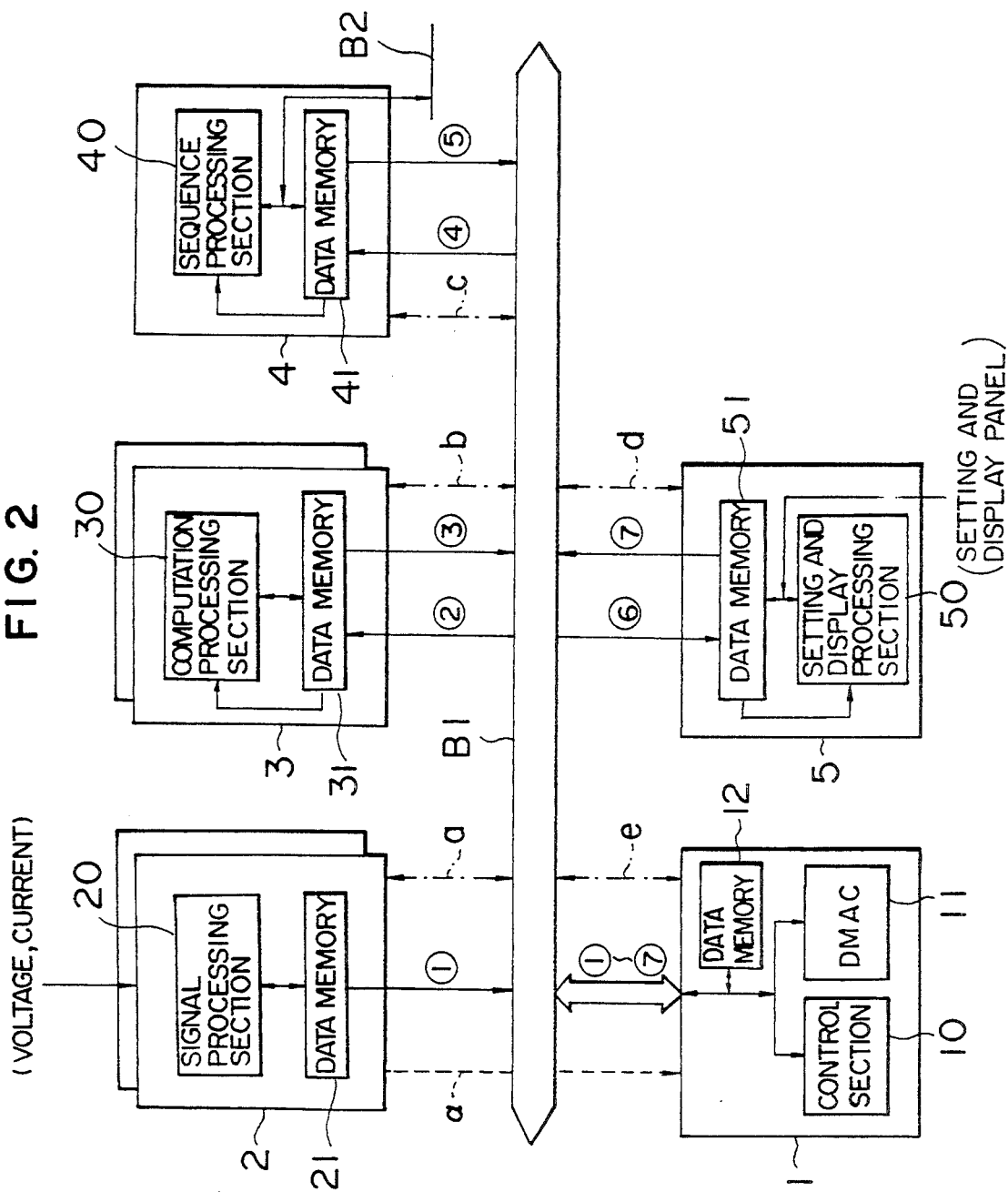
FIG. 2 is a block diagram showing an inter-unit data transfer control according to an embodiment of the present invention.

Now, explanation will be made about an example of the data transfer control between the units 1 to 5 connected to the general-purpose system bus B1, that is, the data transfer control of a multiprocessor with reference to FIGS. 2 and 3. In FIG. 2, the units 1 to 5 are identical to those designated by the same reference numerals in FIG. 1.

In the system control unit 1, numeral 10 designates a control section including a general-purpose microprocessor, numeral 11 a direct memory access controller (DMAC) for high-speed data transfer, and numeral 12 a data memory.

In the analog input unit 2, numeral 20 designates a signal processing section including a digital signal processor DSP of floating point arithmetic type (which may be replaced by a fixed point arithmetic type with equal effect), and numeral 21 designates a dual-port data memory including a dual-port random access data memory (DPRAM).

In the relay processing unit 3, numeral 30 designates a computation processing section including a DSP of floating point arithmetic type (which may be replaced with equal effect by a fixed point arithmetic type), and numeral 31 a dual-port data memory including a dual-port random access data memory (DPRAM).

In the sequence processing unit 4, numeral 40 designates a sequence processing section 40 including a general-purpose microprocessor and numeral 41 a dual-port data memory including a DPRAM.

In the setting and indication processing unit 5, numeral 50 designates a setting and display processing section including a general-purpose microprocessor, and numeral 51 a dual-port data memory including a DPRAM.

Also, in FIG. 2, a signal line $a$ carries an interrupt signal for notifying a data fetch period, and signal lines a to carry fault notification and recognition signals (SYS FAIL) for each unit.

Now, a data transfer system according to this embodiment will be explained with reference to FIG. 3 in addition.

Figure 3:
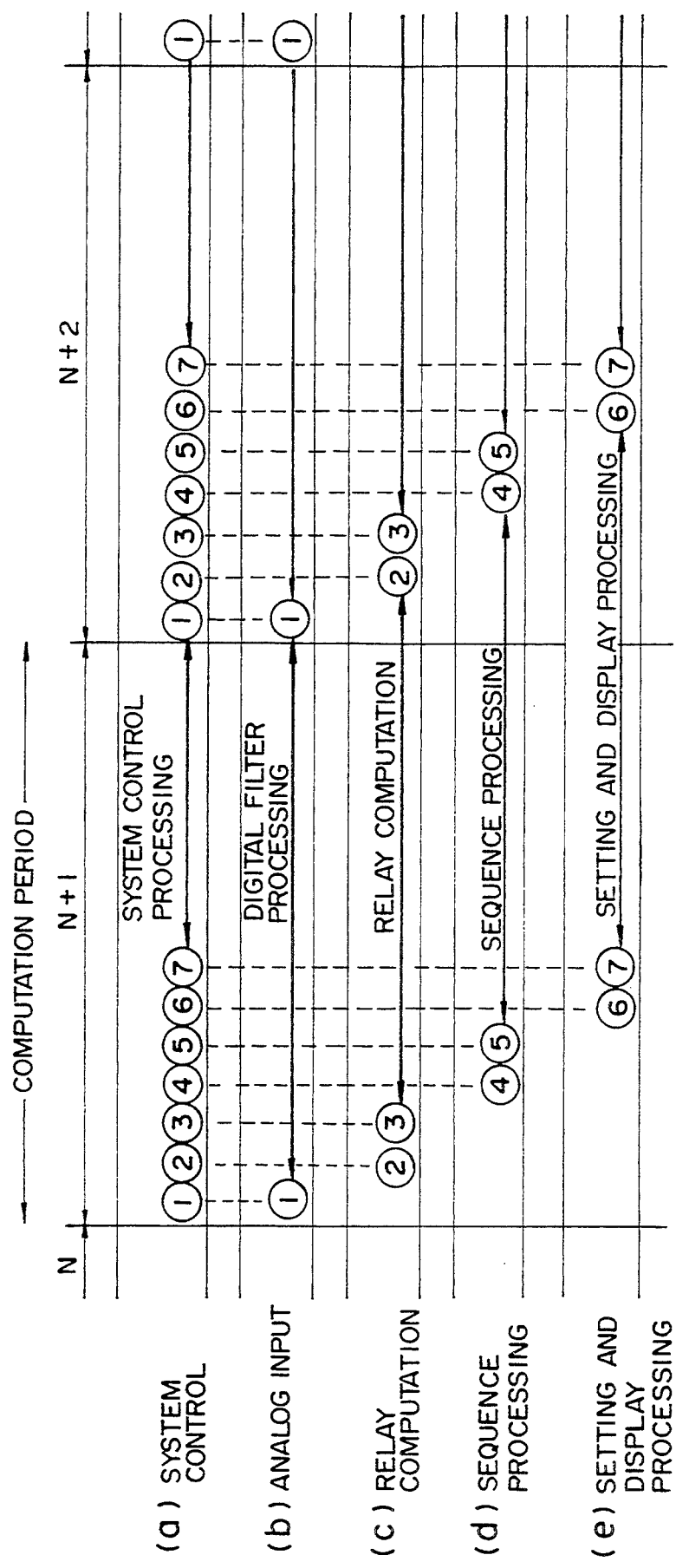
FIG. 3 is a time chart showing an example of timings of inter-unit data transfer according to an embodiment.

FIG. 3 illustrates data transfer timings in time series. In FIG. 3, (a) designates the processing of the system control unit 1, (b) the processing of the analog input unit 2, (c) the processing of the relay computation unit 3, (d) the processing of the sequence processing unit 4, and (e) the processing of the setting and indication processing unit 5. In this diagram, the dotted arrows ①  to ⑦ indicate the directions of data transfer.

First, the system control unit 1 representing a master unit (a unit which obtains the right to use the general-purpose system bus to start data transfer) is supplied with N-period data ① from the analog input unit 2 making up a slave unit (a unit responding to the data transfer made by the master unit). This data is voltage or current data of the power system, for example, processed through a digital filter in the N period by the analog input unit 2 using sample data in and before the N-1 periods. The data ① may be input either in the control section 10 or the DMAC 11 of the unit 1. The data ① thus input is stored in the data memory 12.

The system control unit 1 transfers the data ① stored therein as an input to the relay computation unit 3 operating as a slave unit, which data is designated by ② in FIG. 2.

Further, the relay computation result ③ computed in the N period (using an analog input unit output in and before the N-1 period) is applied to and stored in the data memory 12 of the unit 1.

The system control unit 1 then transfers the data ③ stored therein as an input to the sequence processing unit 4 operating as a slave unit, which data is designated by ④ in FIG. 2.

Further, the sequence processing result ⑤ computed in the N period (using the relay computation result in and before the N-1 period) is applied to and stored in the data memory 12 in the unit 1.

The system control unit 1 then transfers the data ⑤ stored therein as an input to the setting and display processing unit 5 operating as a slave unit, which data is designated as ⑥ in FIG. 2.

Furthermore, the relay set value ⑦ stored in the DPRAM of the unit 5 is applied as an input, and stored in the data memory 12 of the system control unit 1. This data ⑦, which is a set value for the relay, is incorporated into the data ② and transferred by the system control unit 1, together with the data ① applied from the unit 2, to the relay computation unit 3 at each sampling time, and is stored in the UPRAM of the unit 3. By so doing, a change in the set value is met immediately.

As obvious from FIG. 3, it is understood that upon completion of data transfer, each unit is capable of fully processing the assigned functions before the next sampling time. Specifically, from the completion of data transfer at a particular timing, each unit is in a position to make computation making full use of the sampling period with the data for a particular timing. This is due to the provision of the dual-port data memories 21, 31, 41 and 51 in the units shown in FIG. 2.

The data transfer timing ① in FIG. 3 is effected by an interrupt signal line e shown in FIG. 2. This signal line a is synchronous with a sample command for sampling the voltage and current of the power system and is issued from the unit 2. This timing is identical to the sampling period of the original sampling signal frequency-divided appropriately.

The data transfers ② to ⑦ are of course effected following the transfer ① as easily understood.

The foregoing description concerns the division of the functions of a digital protective relay system applied to the present embodiment, a general block configuration and examples of data transfer between the divided units.

In the aforementioned embodiment, the system control unit 1 controls the other four units 2 to 5. The units controllable by the system control unit 1, however, are not limited to them. Other units to be controlled may be added to the extent that the transfer processing to all the units is covered within a single processing cycle of the system control unit 1 as shown in FIG. 3.

For addition of a unit, the unit may be connected to the system bus B1 and an address in set for the particular unit while at the same time modifying the control program of the system control unit.

A unit of the same function as a giver unit may be added if the objective of system modification is to improve the processing capacity of the given unit. If it is desired to add a different function to the system, on the other hand, a unit having such a function may be added.

By adding an analog input unit, for example, more signals are processable. If a relay computation unit is added, on the other hand, more computations are made possible, thus attaining multiple functions and high performance of the relay.

By adding a unit having a different function, by contrast, various functions may be added to the digital relay. If a communication function is provided, for instance, information exchange with other relay systems is made possible, or central control is attained at a master unit with the system as a slave unit.

It is of course possible in this system not only to add units but also delete or modify any of the units.

For example, the computation unit may be replaced by a unit capable of operation at higher speed. In this way, the processing capacity within a given period is improved for an increased volume of processable information. As a result, more signals become processable. Also, the computation that has thus far been executed by a plurality of computation units becomes processable by a fewer number of units, thus decreasing the number of units required. As long as the information to be processed is identical to each other, in contrast, a computation of high accuracy or one which is complicated in nature may be executed in a limited time, and therefore the system accuracy and functions are improved.

This principle is applicable to system construction, and various systems including a digital relay system may be built up by selecting the units according to the object.

In this way, according to the method of the present embodiment, various systems are built up to meet the particular object, and the system thus built up is so flexible that it is easily expanded, has functions added thereto, and is improved in speed or accuracy or functions.

Now, an outline of a digital protective system for power applications will be explained prior to detailed explanation of the respective units. The processing operation in general will be explained with reference to FIGS. 4, 5, 6A and 6B. First, the general processing operation of a power protective system will be explained with reference to FIG. 4.

Step 2001 provides for supplying of information from a power system, that is the voltage and current of a transmission line, for example, and converts an analog amount into a digital one.

Step 2002 detects an electrical amount for accident detection or control. The electrical amount thus detected includes the magnitude of the voltage or current at the time of an accident of the power system, the impedance Z up to the accident point, resistance component R, reactance component X, the direction of the accident point or the frequency at the time of accident.

Step 2003 compares the electrical amount detected at step 2002 with a predetermined set value. If the comparison shows an accident, the process proceeds to step 2004.

Step 2004 decides whether the accident condition determined at step 2003 is sustained, and if sustained, the process proceeds to step 2005.

Step 2005 stores the information related to the accident detected in the preceding steps.

Step 2006 effects a well-known system sequence processing (which may be combined with an external condition or timer) on the basis of the various relay operations stored in step 2005. If an accident is detected, a cut-off command is issued to the circuit breaker.

Step 2007 checks and monitors the system.

The digital control protective system for power applications is designed to execute the above-mentioned processing operations within the sampling period of the analog sample input repeatedly.

Figure 5:
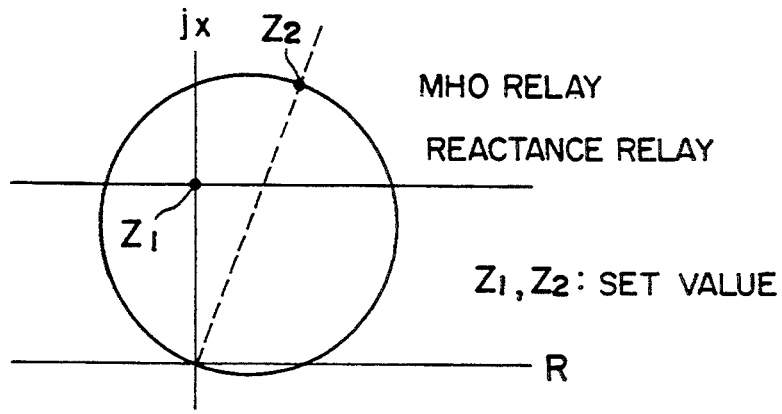
FIG. 5 is a graph showing an example of a well-known protective relay characteristic.

FIG. 5 shows an example of a reactance relay (for one element) and the characteristic of a mho relay. In FIG. 5, the character jx designates in inductive reactance component of the impedance.

Figure 4:
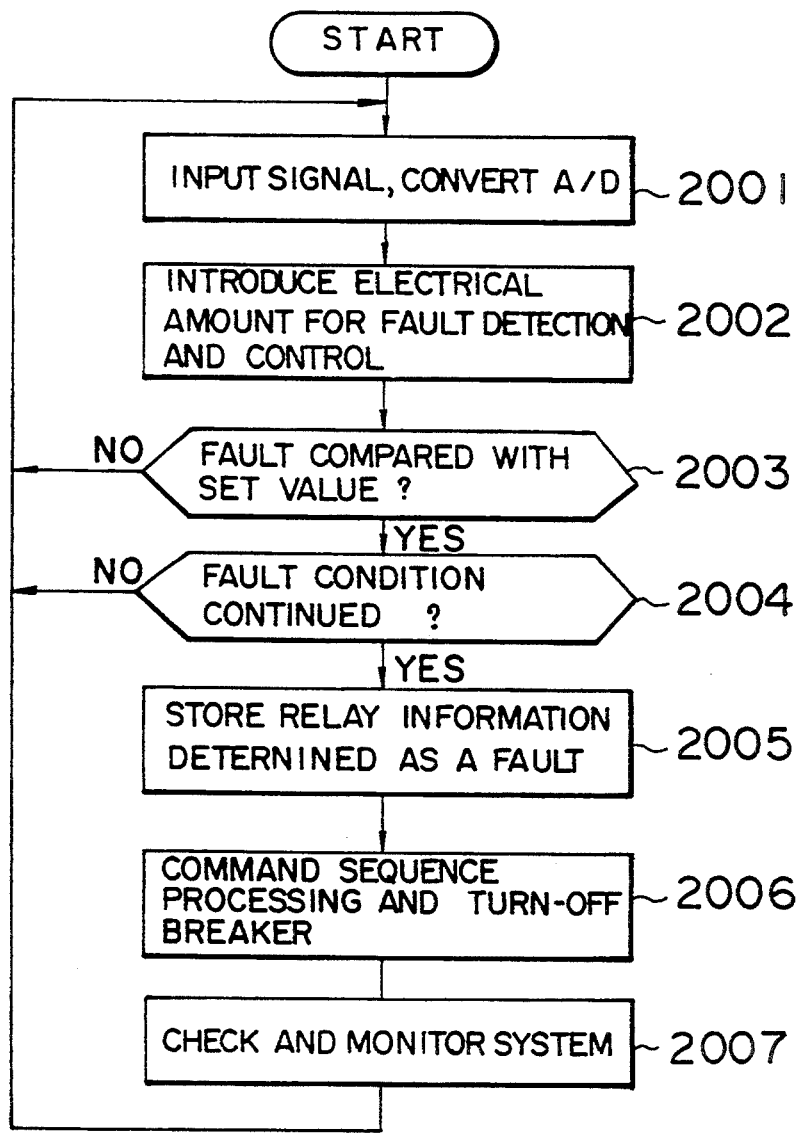
FIG. 4 is a flowchart showing a general processing operation of a protective relay.

Step 2002 in FIG. 4 processes about 30 to 50 relay elements. The sequence processing at step 2006 is made in correspondence with the system on the basis of these relay element outputs. Set values are shown by $Z_1$ and $Z_2$ in FIG. 5, which values determine a protection range in the case of a protective relay, These values are changed on line by an operator from outside the system in the case where the power system or the associated protection range is changed, as is well known.

Figure 6A:
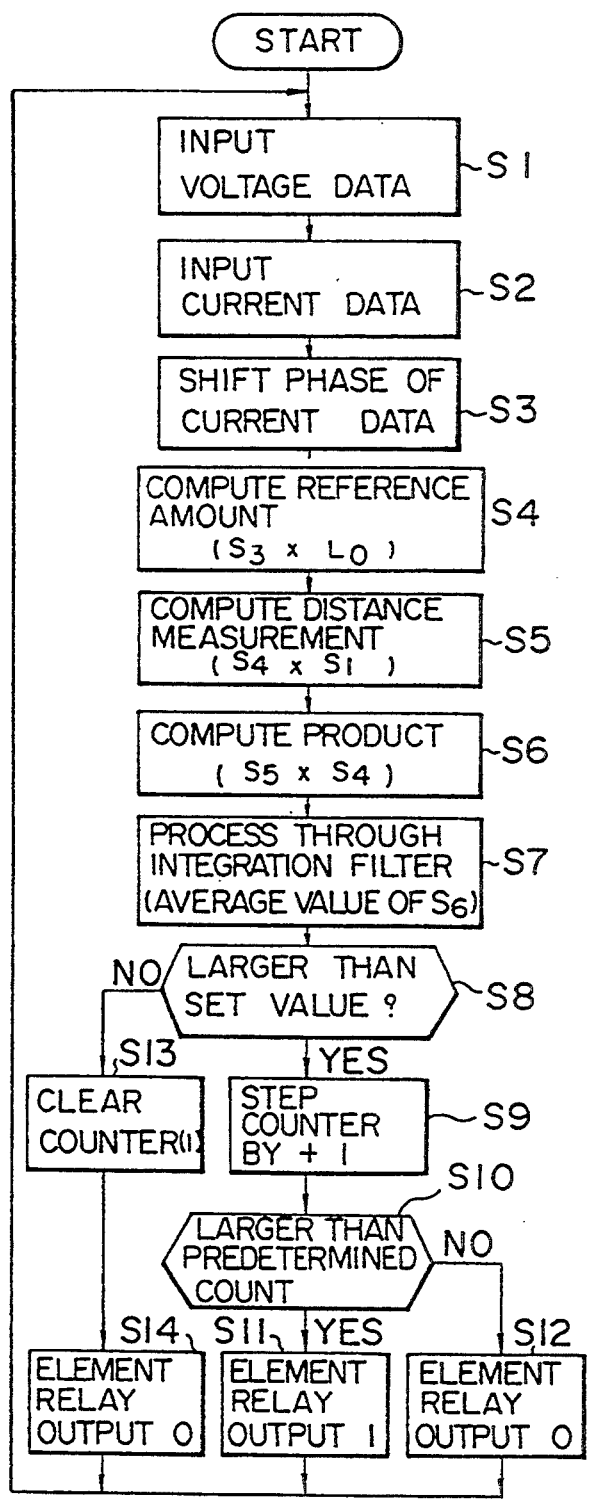
FIG. 6A is a flowchart showing the processing operation of a reactance relay.
Figure 6B:
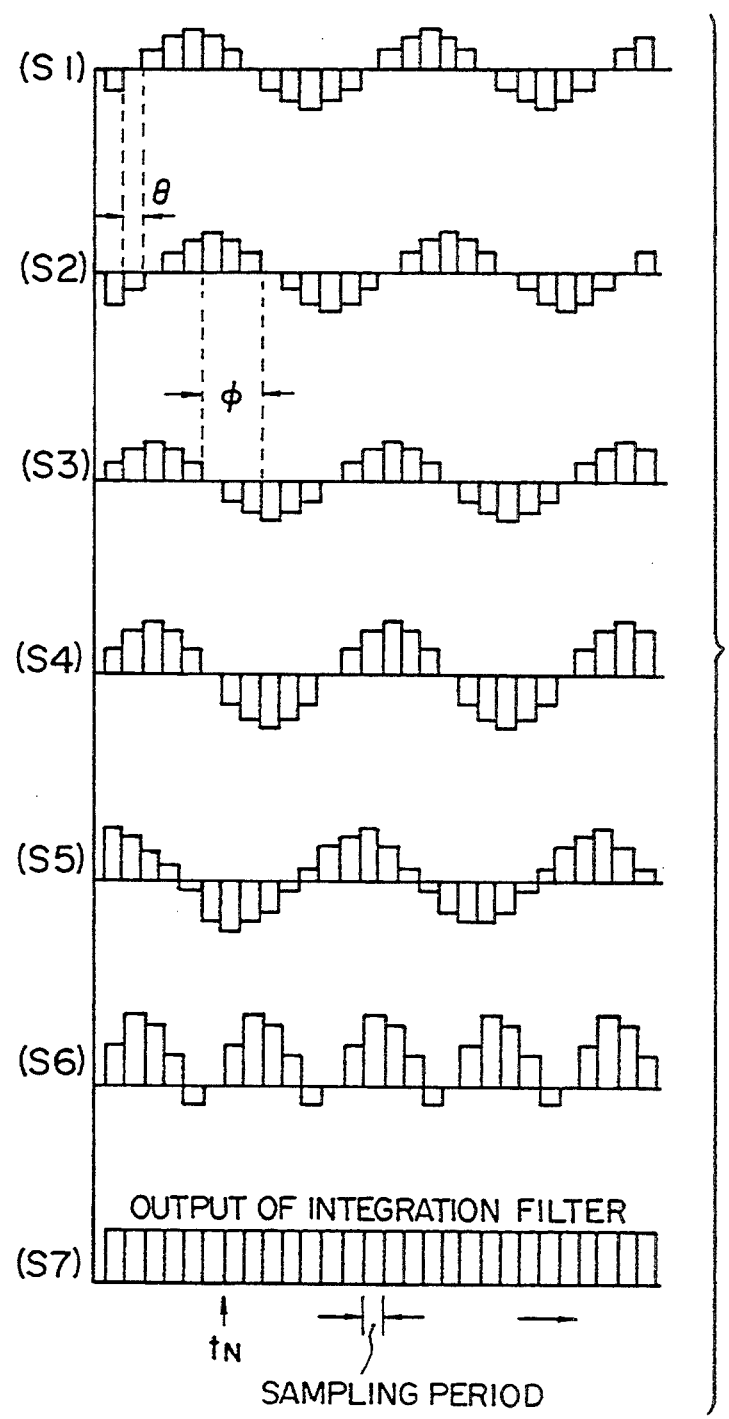
FIGS. 6B (S1) to 6B (S7) are diagrams showing waveforms processed accordingly.

FIG. 6a shows an example of the processing flow of a reactance relay shown in FIG. 5 and FIG. 6B shows example of waveforms in which the steps S1 to S7 correspond to the steps S1 to S7 in FIG. 6A.

In the case of this reactance relay, first, the voltage and current data are applied (steps 1 and 2), various computations are made about these inputs (steps S3 to S7), and the computation result is compared with a set value (step S8). If the computation result is larger than the set value, a counter (not shown) for checking the sustaining time of a fault is incremented by +1 (step 9).

Then, step S10 checks whether the count on the counter has exceeded a predetermined value. If the count is larger than the predetermined value, it is decided that the condition is prevailing for energizing the relay, and a "1" output is produced at the element relay (step S11). If the count has not yet reached the predetermined value, by contrast, a "0" output of the element relay is produced while leaving the relay off (step S12).

In the case where step S8 finds that the computation result is smaller than a set value, the counter is cleared (step S13), so that the output of the element relay is of course zero (step S14).

An outline of the power protective relay system will be understood from the foregoing explanation.

Now, an explanation will be given for the configuration and the processing functions of each unit shown in FIG. 1 embodying the present invention in which the functions of a power-system digital protection system are optimally distributed to meet the requirements of compactness, system expansion and multiple and higher functions, while at the same time realizing a high performance (accuracy and speed) and high reliability.

First, a configuration and an outline of the processing operation of the analog input unit shown in FIG. 1 according to an embodiment of the present invention will be explained with reference to FIGS. 7 and 8. A configuration of the analog input unit 2 (in FIG. 1) is shown in FIG. 7.

Figure 7:
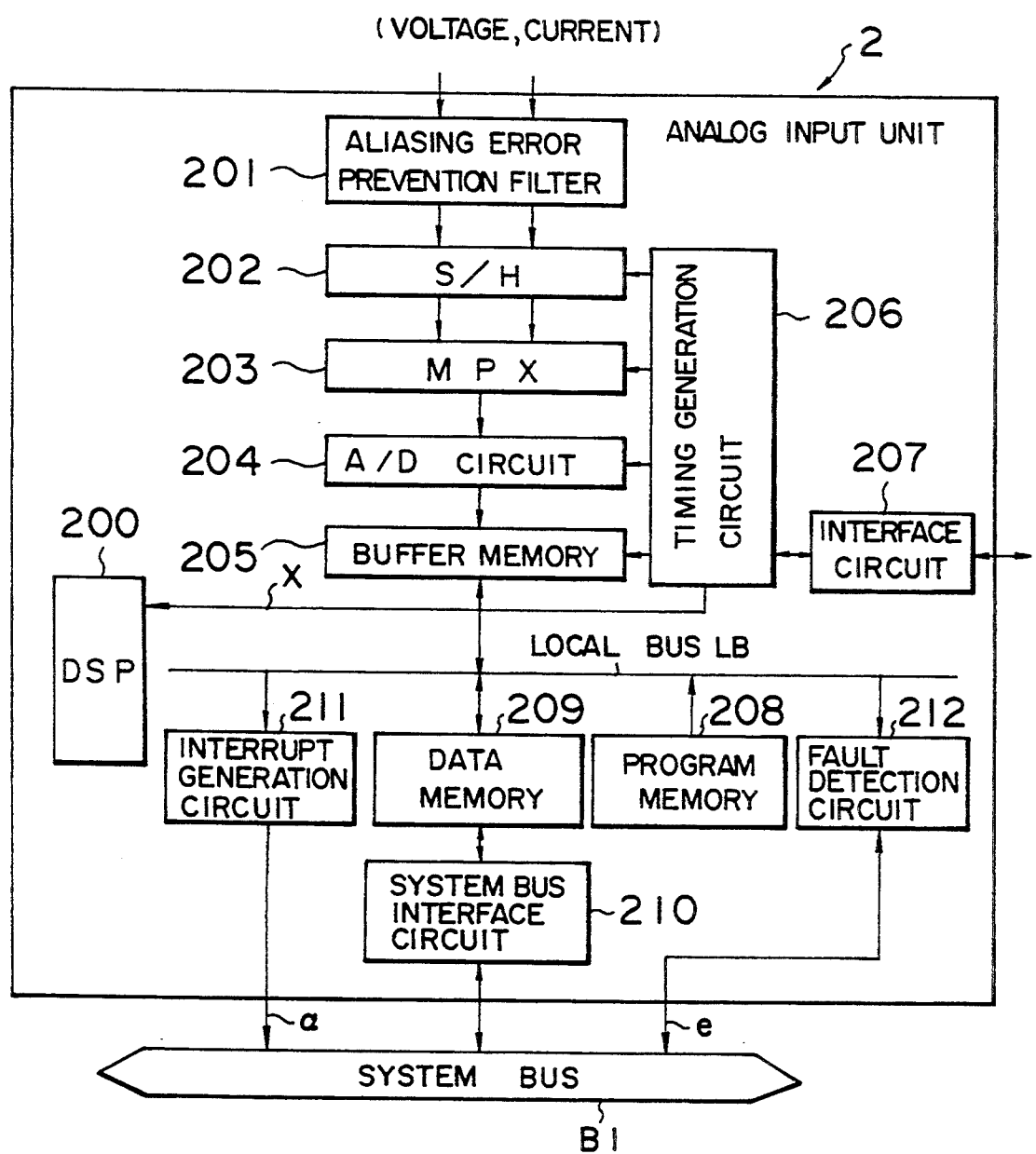
FIG. 7 is a block diagram showing a configuration of an analog input unit.

In FIG. 7, numeral 201 designates a filter for preventing an aliasing error of a plurality of channels, numeral 202 a sample hold circuit (S/H) for a plurality of channels (all-channel simultaneous sampling system), numeral 203 a multiplexer (MPX), numeral 204 an analog/digital converter circuit, numeral 205 a dual-port buffer memory using a dual port random access memory (hereinafter called DPRAM), numeral 206 a timing generation circuit, and numeral 207 an interface circuit for synchronizing the units or a particular unit with other systems or the like (such as an input signal).

Numeral 200 designates a digital signal processor (hereinafter called DSP), numeral 208 a program memory of the DSP 200, numeral 209 a dual-port data memory using the DPRAM, numeral 210 a system bus interface circuit, numeral 211 an interrupt generation circuit, and numeral 212 a fault detection circuit.

A signal line a is for carrying an interrupt generation signal (for the unit 1) to take in the data, and a signal line e for carrying a fault notification and recognition signal (SYS FAIL).

The buffer memory 205, the DSP 200, the program memory 208, the dual-port data memory 209, the interrupt generation circuit 211 and the fault detection circuit 212 are connected to the local bus LB. Also, the interrupt generation circuit 211 and the fault detection circuit 212 are connected to the system bus B1. Further, the dual-port data memory 209 is connected to the system bus B1 through the system bus interface circuit 210.

Now, an outline of the processing operation will be explained with reference to FIG. 8.

After the initialization at step 2020, step 2021 checks whether a data input interrupt has occurred after A/D conversion of input information (system voltage and current) by checking the signal line X. This is effected by the DSP 200 shown in FIG. 7.

In the case where a data input interrupt has occurred, the data of all the channels for the particular sampling time is applied at step 2022, and step 2023, using the particular data and other data stored at a previous sampling time as required, effects the filter computation (digital filter computation) for all the channels. This computation is of course executed by DSP 200 in compliance with a command stored in the program memory 208. An outline of the DSP and the digital filter computation will be explained later herein.

Step 2024 monitors and checks for improving the reliability. This monitoring and checking operation will be described later herein.

Step 2025 operates the counter C stepwise, and step 2026 decides whether the counter C has reached a predetermined value ($\alpha$). The operation of steps 2025 and 2026 is performed by counting the number of data input interruptions at step 2021. This counter C is set, for example, in the DSP 200.

In the case where step 2026 decides that a predetermined value has been reached, step 2027 clears the counter. Step 2028 stores the result of filter computation for all the channels in the dual-port data memory (DPRAM) 209, followed by step 2029 for initiating an interruption to fetch the data against the system control unit 1 in FIG. 1.

As seen from the foregoing description, the analog input unit 2 according to the present embodiment is different in the processing sequence from the analog input for the digital relay described in the Journal of the Institute of Electrical Engineers of Japan, Vol. 105, No. 12, described above.

Specifically, the latter well-known analog input is effected from a filter (analog) to a S/H (sample hold) to MPX (multiplexer) to A/D (analog/digital conversion) to predetermined computation. In contrast, the analog input section according to the embodiment under consideration is effected from a S/H (sample hold) to A/D to digital filter to a predetermined computation.

Figure 8:
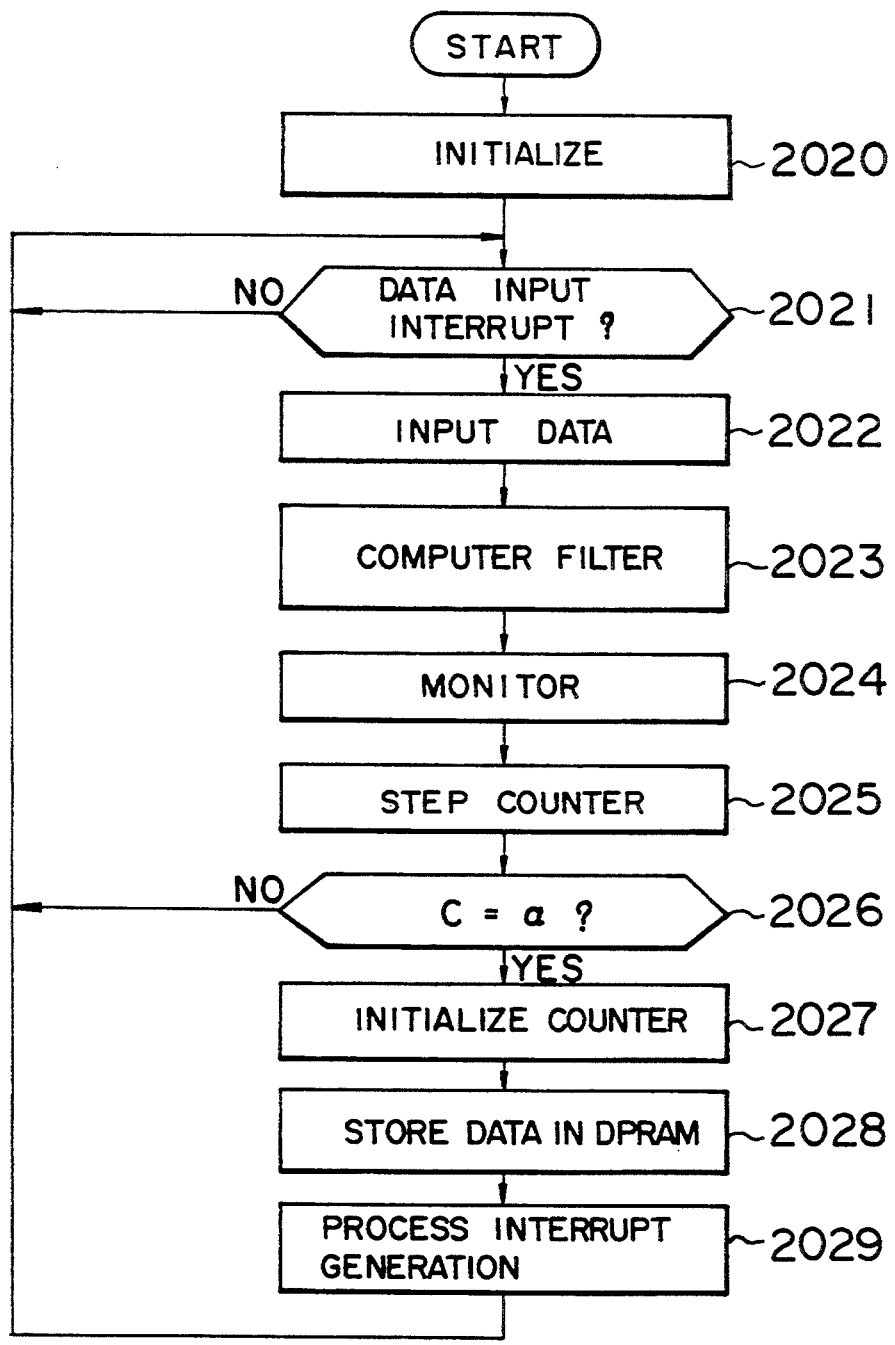
FIG. 8 is a flowchart showing the processing operation of the analog input unit.

Also, as clear from step 2026 in the processing flow of FIG. 8, the period of digital filter computation at step 2023 is $1/\alpha$ ($\alpha$: Positive integer) of the period for data transfer to another unit. Assume that the computation period of the digital filter is 167 $\mu$s (6-kHz sampling) and $\alpha$ is 10, for example. The period of data transfer to another unit (the system control unit 1 shown in FIG. 1 according to the present embodiment) is 1667 $\mu$s (equivalent to 600-Hz sampling). Specifically, the digital computation is effected in a period 1/10 the period of digital protective computation. The value of $\alpha$ may of course be set or changed as desired according to the system involved.

If a multiplicity of channels are required by a system, on the other hand, a plurality of analog input units may of course be connected to a plurality of system buses respectively, and these units are synchronized through the interface circuit 207 shown in FIG. 7 for parallel processing.

As will be seen from the foregoing description, the analog input unit according to this embodiment operates such that the errors of S/H, MPX and A/D (offset voltage, noise, quantization errors) are collectively removed by the digital filter and the resulting data is used for an intended relay computation, thus greatly improving the characteristics as compared with the conventional configurations.

Now, an embodiment of the system control unit 1 shown in FIG. 1 will be explained with reference to FIG. 9.

Figure 9:
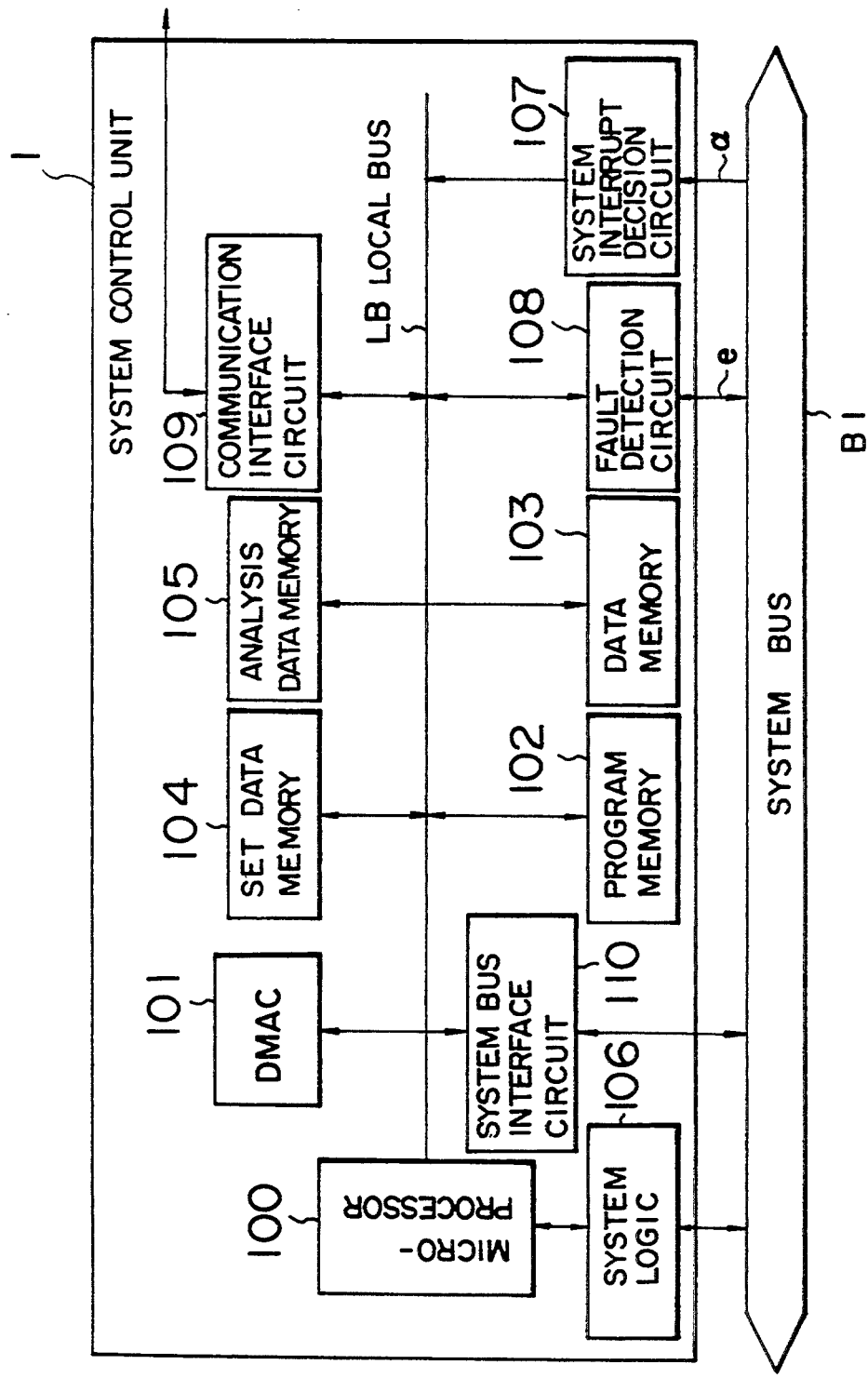
FIG. 9 is a block diagram showing a configuration of a system control unit.

In FIG. 9, numeral 100 designates a general-purpose microprocessor, and numeral 101 a direct memory access controller (hereinafter called DMAC) for high-speed data transfer.

Numeral 102 designates a program memory using a PROM, for example, numeral 103 a data memory using a RAM, numeral 104 a set data memory for storing set data including settings, constants and coefficients by use of an electrically erasable and rewritable nonvolatile memory E²PROM, and numeral 105 an analysis data memory including a static random access memory (SRAM) and a nonvolatile memory E²PROM similar to the abovementioned memory packaged in the same chip (IC) for storing data at high speed and analyzing a fault which may occur.

Further, numeral 106 designates a system logic unit including a system reset, system clock and a bus access reconciliation circuit, numeral 107 a system interruption decision circuit, numeral 108 a fault detection circuit, numeral 109 a communication interface (RS-232C) circuit for connecting with a personal computer or the like, and numeral 110 a system bus interface circuit.

The analysis data memory 105, as described above, includes a SRAM and an E²PROM and has a function that all the data in the SRAM is transferred to the E²PROM at one time by a store control signal (pulse) on the one hand, and all the data in E²PROM to SRAM at one time by a recall control signal (pulse) on the other.

As a result, if the system is so configured that a store control signal is generated on the occasion of a power failure or upon detection of a unit fault or the like, the immediately preceding data is maintained in the nonvolatile E²PROM suitably for restarting the operation or analyzing the fault.

The microprocessor 100 is connected to a local bus LB. The local bus LB is connected to the DMAC 101, the set data memory 104, the analysis data memory 105, the system interface circuit 110, the program memory 102, the data memory 103, the fault detection circuit 108, the communication interface circuit 109 and the system interrupt decision circuit 107.

Now, explanation will be made about a configuration of the relay processing unit 3 shown in FIG. 1 according to an embodiment of the present invention with reference to FIG. 10.

Figure 10:
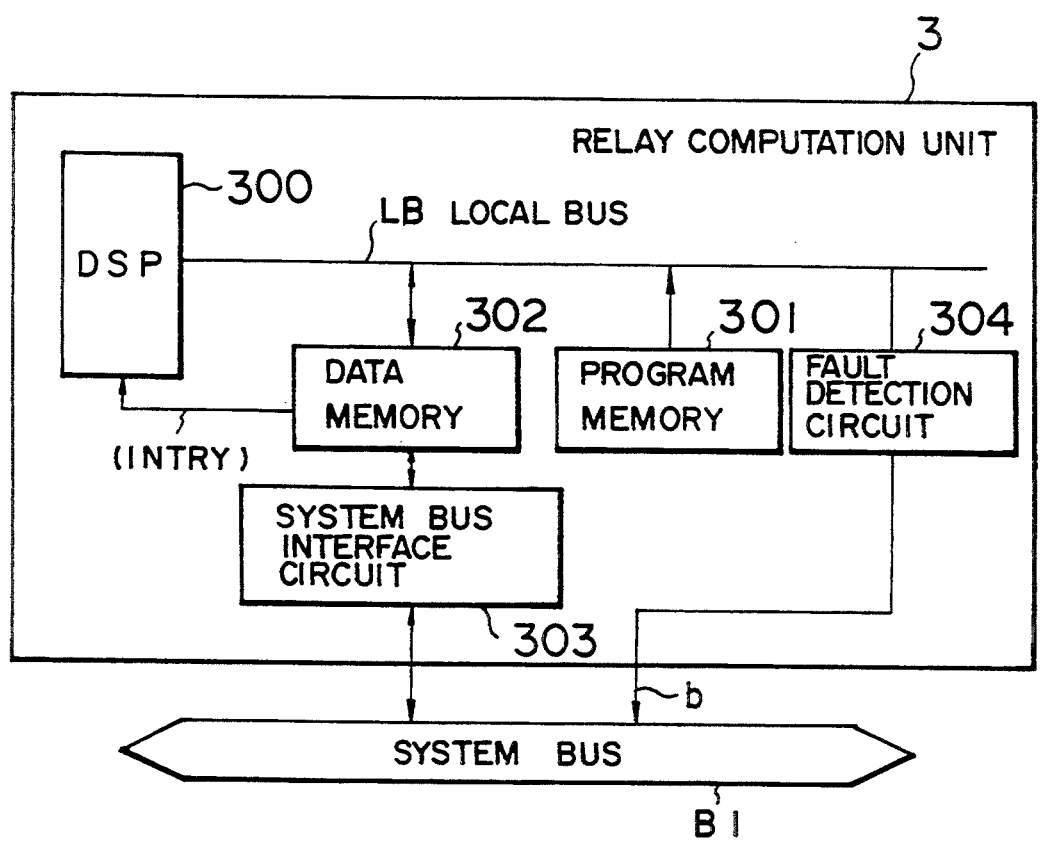
FIG. 10 is a block diagram showing a configuration of a relay computation unit.

In FIG. 10, numeral 300 designates a processor (DSP) for computation processing, numeral 301 a DSP program memory using an EPROM, numeral 302 a dual-port data memory using a data storage DPRM, numeral 303 a system bus interface circuit, and numeral 302 a fault detection circuit. An outline of the DSP will be explained later herein.

This relay computation unit is for processing the steps 1 to 5 at high speed. Specifically, it is a processor unit for processing the operation for the digital control and protection of a power system. Depending on the particular system, a plurality of these units may be connected to a system bus for parallel processing.

The processing operation according to an embodiment of the system control unit 1 shown in FIG. 9 will be briefly explained with reference to FIG. 11A. An outline of the processing operation of the relay computation unit 3 in FIG. 10 is also shown in FIG. 11B.

Figure 11A:
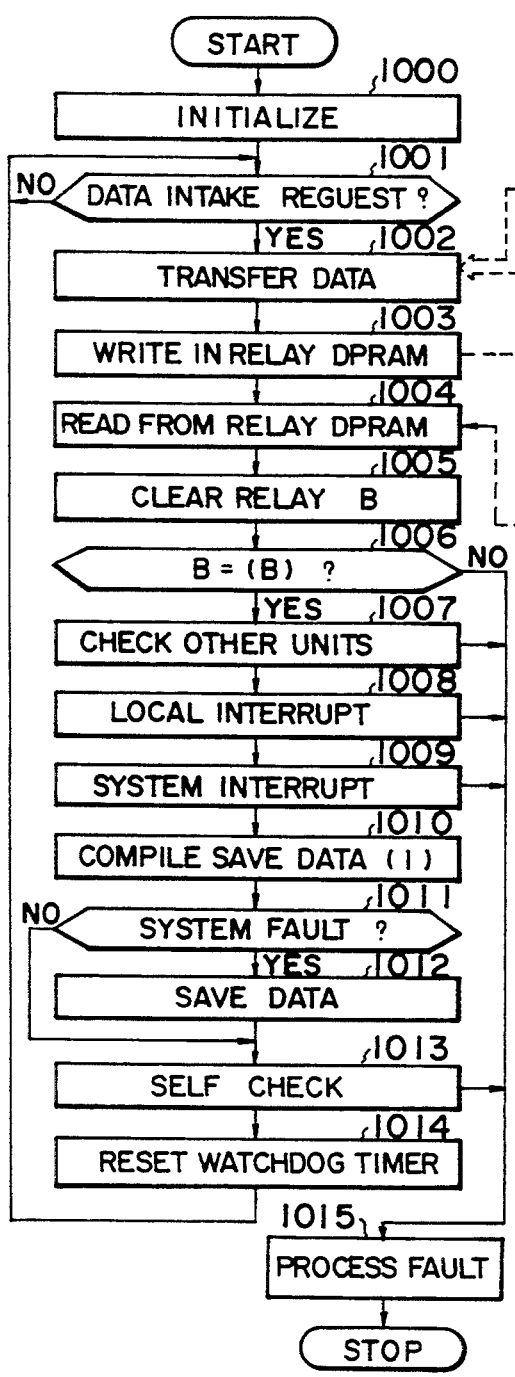
FIGS. 11A and 11B are flowcharts showing the processing operations of a system control unit and a relay computation unit, respectively.
Figure 11B:
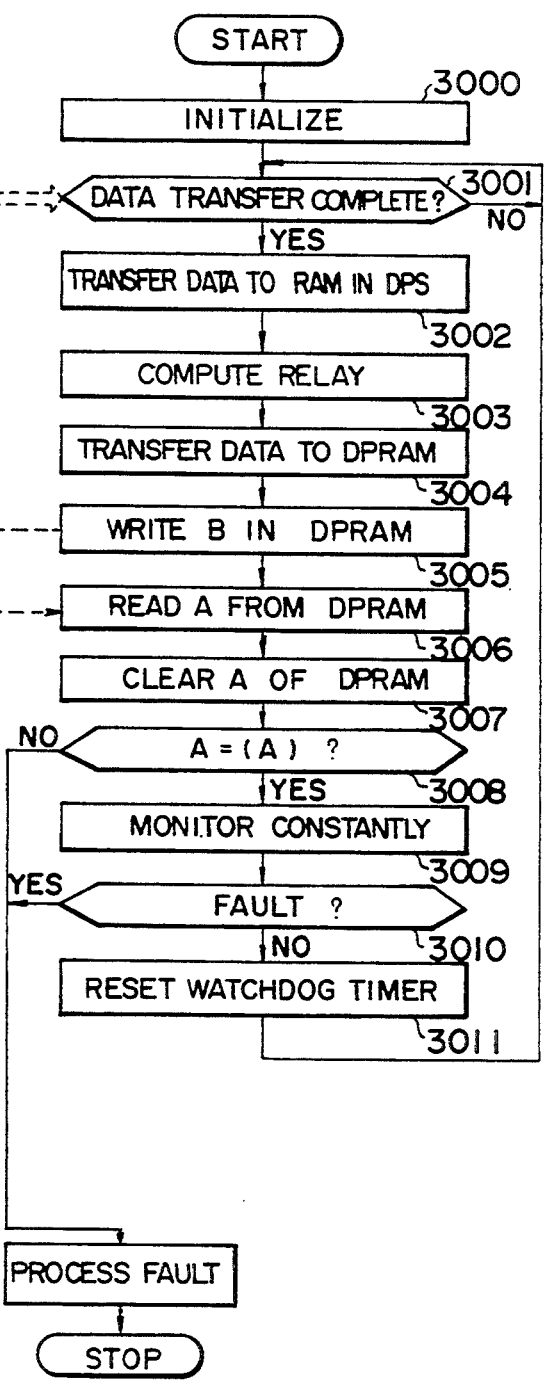

The processing operation of the system control unit 1 is effected in the manner shown in FIG. 11A.

(1) After initialization, a decision (waiting for interrupt) is made as to whether there is a data intake request (α times the digital filter computation period) from the analog input unit 2 (steps 1000, 1001).

(2) As explained with reference to FIGS. 2 and 3, data transfer is made between the units (step 1002). Specifically, data transfer control between the units is effected by the system control unit 1.

(3) Mutual checking is made to see whether data transfer is normally made between the units (steps 1003 to 1007).

(4) The local and system interrupt processing is effected (steps 1008, 1009).

(5) The data to be stored in the set data memory 104 and the analysis data memory 105 shown in FIG. 9 are compiled. At the same time, the data is saved in case a fault occurs in the system (steps 1010 to 1012).

(6) Self diagnosis (self check) is effected (steps 1013, 1015).

The system control unit 1 repeatedly executes the above-mentioned processings for each time of a receipt of data intake request, that is, in each protection (control) computation period. It will be easily inferred that in the case of exchange or addition of units, the data transfer control corresponding thereto is of course changed for executing the processing. Though not shown, the hardware and software for controlling these operations are of course built in the units.

Now, an outline of the processing operation of the relay computation unit 3 shown in FIG. 10 will be explained with reference to FIG. 11B.

(a) After an initialization step, a decision is made as to whether data transfer from the system control unit 1 has been finished (waiting for an interruption using the signal line INTRY in FIG. 10) (steps 3000, 3001).

(b) The data transferred to the dual-port data memory in FIG. 10 is transferred again to the data memory in the DSP 300. This is for processing the computation using the DSP 300 at high speed.

(c) The protective relay processing operation for the power system according to a predetermined algorithm is effected (step 3003).

(d) The computation result is transferred to the dual-port data memory 302 shown in FIG. 10 (step 3004). This computation result is transferred again by the system control unit 1 to the sequence processing unit 4 described later herein.

(e) The constant monitoring operation (steps 3009 to 3011) including mutual check and self check is effected to see whether data transfer with the system control unit 1 is normally effected (steps 3005 to 3009).

As explained above, the relay computation unit 3 is operated repeatedly for each data transfer period, that is, for each computation period. The computation time can be fully used without overhead from an interrupt for end of data transfer to the next transfer interrupt, thus improving the processing capacity. Also, the relay computation processing of step 3003 is for executing a multiplicity of types and numbers of processing operations mentioned in FIGS. 5 and 6.

Now, an example of the technique for detecting a fault by mutual check and monitor by data transfer between the units (system control unit 1 and the relay computation unit 3) will be explained with reference to FIGS. 11A and 11B.

First, the monitor operation of the system control unit 1 shown in FIG. 11A will be explained.

(Step 1003)

This step is for checking to see whether the relay computation unit 3 has transferred thereto a predetermined data (A in this example) in every period from the system control unit 1. The system control unit 1 transfers a fixed data A in every period to a given fixed area (say, address N) of the dual-port data memory 302 in FIG. 10.

(Step 1004)

This step is for the system control unit 1 to take in a fixed data B from a given fixed area (say, address M) of the dual-port data memory 302 in FIG. 10. The data B at address M is cleared in every period by the system control unit 1 and set by the relay computation unit 3 in every period.
(Step 1005)

In view of the fact that step 1004 receives the data (normally, B) from address M of the dual-port data memory 302 in FIG. 10, the data B should be stored at address M in the next period if the relay computation unit 3 is normal. Step 1005 is for clearing the data B to discriminate the case where the data remains stored.
(Step 1006)

This step is for deciding whether the data applied from address M is B or not. If it is B, it is decided that data transfer with the relay computation unit 3 is also normal. Further, if the data is B, it is decided that the relay computation unit 3 processes the step 3005 in FIG. 11B normally. In the case where the data received from address M is not B, it is decided that the relay computation unit 3 is not operating normally. This is because whether a data transfer is normal or not is easily decided by making access to another address (say, address M+1) if the address M is not accessible normally.

Now, the check and monitor operation of the relay computation in FIG. 11 B will be explained.
(Step 3005)

This step is for storing a fixed value B in every period at address N of the dual-port data memory 302 in FIG. 10. This is effected by the system control unit 1 taking in a fixed value in every period to decide whether the relay computation unit 3 is operating in normal way. Specifically, this step is one for having other units monitor the particular unit.
(Steps 3006, 3007, 3008)

These steps enable the relay computation unit 3 to monitor the system control unit 1.

Step 3006 takes in data from address M of the dual-port data memory 302 in FIG. 10. As mentioned above, the fixed value A is transferred in every period to this address M if the system control unit 1 is normally operating.

Step 3007 is for clearing the data at address M received at step 3006. If the system control unit 1 is normally operating, the fixed value A should be transferred to address M again before the next period.

Step 3008 is for deciding whether the data received from address M is A or not. If it is A, it is decided that the system control unit 1 is normal, and if the data is not A, it is decided that the system control unit is faulty.

Instead, the memory including address M may be faulty when the decision is that the data is not A. Whether the memory is faulty or not may be decided, however, by making access by the DSP 300 of the relay computation unit 3. If the decision is not the data A, on the other hand, the system bus interface circuit 303, not the system control unit 1, may be faulty in FIG. 10. This discrimination, however, is made from the fact that if the system bus interface circuit 303 is faulty, the processing operation (access to address N) of the system control unit 1 should also be faulty).

It will be understood from the foregoing description that the processors mounted on both the units 1 and 3 make mutual check possible. As a result, a fault of each unit is detectable both quickly and easily.

The system control unit 1 also makes mutual check with other units in quite the same manner as above.
(Step 1007 in FIG. 11A)

Now, a configuration of an embodiment of the sequence processing unit will be explained with reference to FIG. 12.

In FIG. 12, numeral 400 designates a sequence processor for effecting the sequence processing operation by use of a general-purpose computer in a power protective relay system, numeral 401 a program memory using a PROM storing a sequence processing program, numeral 402 a data memory (RAM), numeral 403 a dual-port data memory using a DPRAM, numeral 404 a system bus interface circuit, numeral 405 an input/output bus (hereinafter called the I/O bus) for taking interface with the digital input/output unit 6 (in FIG. 1) described later herein, numeral 406 a fault detection circuit, and numeral 407 a general-purpose communication interface circuit (such as a general-purpose RS-232C) for taking interface with a personal computer or the like.

A configuration of an embodiment of the digital input/output unit 6 connected to the sequence unit mentioned above through the I/O bus will be explained with reference to FIG. 13.

Figure 13:
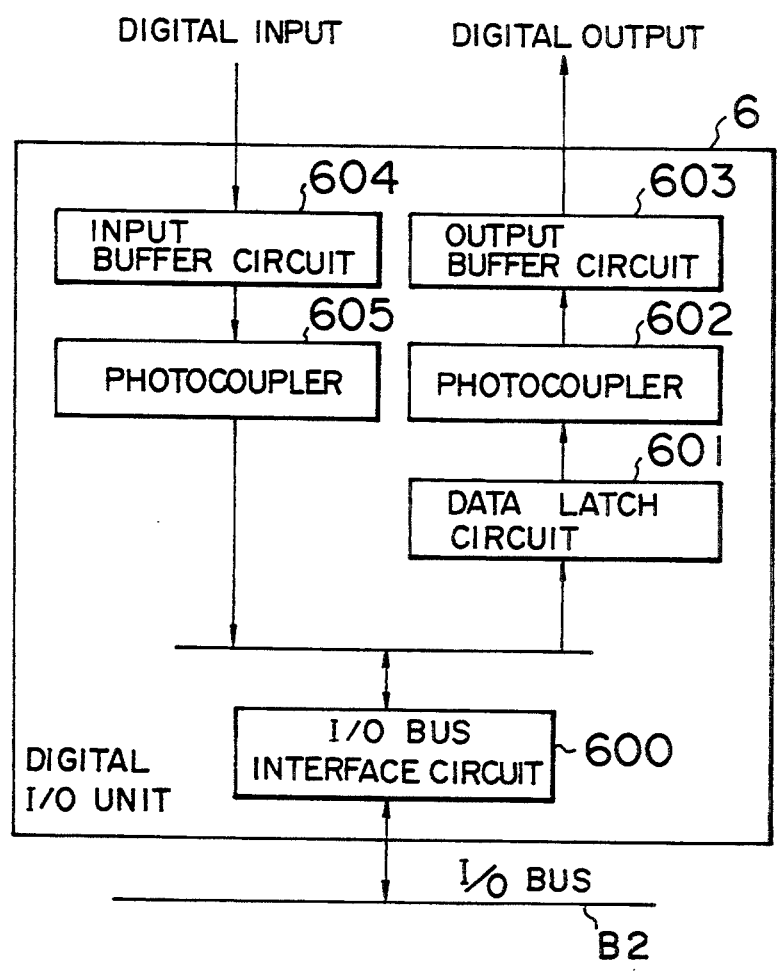
FIG. 13 is a block diagram showing a configuration of an digital input/output unit.

In FIG. 13, numeral 600 designates an I/O bus interface circuit, numeral 601 a data latch circuit, numeral 602 a photocoupler, numeral 603 an output buffer circuit, numeral 604 an input buffer circuit, and numeral 605 a photocoupler. The photocouplers 602 and 605 are both interfaces for electrical insulation.

Figure 14:
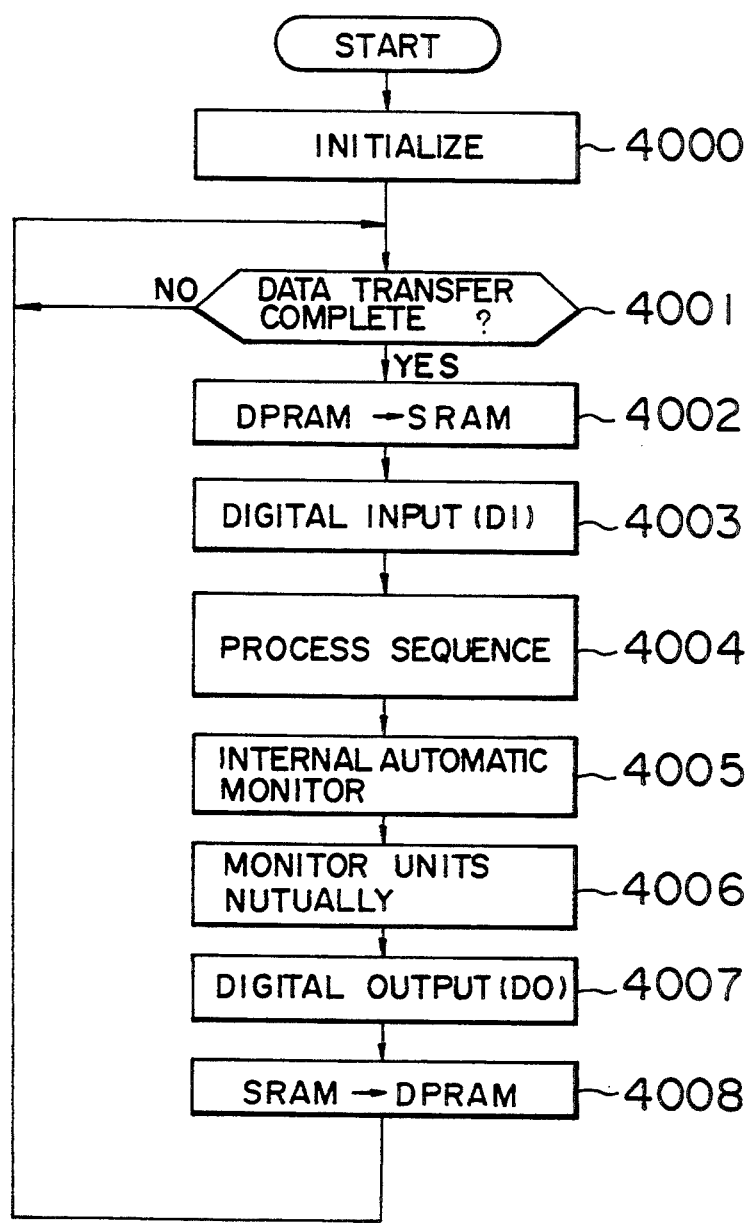
FIG. 14 is a flowchart showing the processing operation of a sequence processing unit.

Now, the processing operation of the sequence processing unit 4 described above will be briefly explained with reference to FIG. 14.

(1) As in the relay computation unit 3, after initialization (step 4000), it is decided (step 4001) whether all the data transfer necessary for sequence processing from the system control unit 1 has been finished or not. This decision is made by checking an interrupt signal INT-SEQ generated upon completion of data transfer from the system control unit 1 as shown in FIG. 12.

(2) The data transferred from the system control unit 1 to the dual-port data memory 403 shown in FIG. 12 is further transferred to the data memory 402 (step 4002).

(3) Digital input processing is effected through the I/O bus 2 (step 4003).

(4) The sequence processing is effected in accordance with a predetermined algorithm (step 4004).

(5) The check and monitor processing in the respective units, and mutual check and monitor processing between the units similar to the one described for the system control unit 1 and the relay computation unit 3 are executed (steps 4005 and 4006).

(6) The result of sequence processing is supplied as an output (digital output) through the I/O bus B2 (step 4007). This output is applied to the digital output section in FIG. 13 through the digital output section in FIG. 13. This information of course contains a cut-off command for an intended circuit breaker.

(7) Further, the result of sequence processing stored in the data memory 402 in FIG. 12 is transferred (step 4008). This is a process for enabling the system control unit 1 to make access to this data. The system control unit 1 transfers this data to the setting and indication processing unit 5 described later herein.

Figure 15:
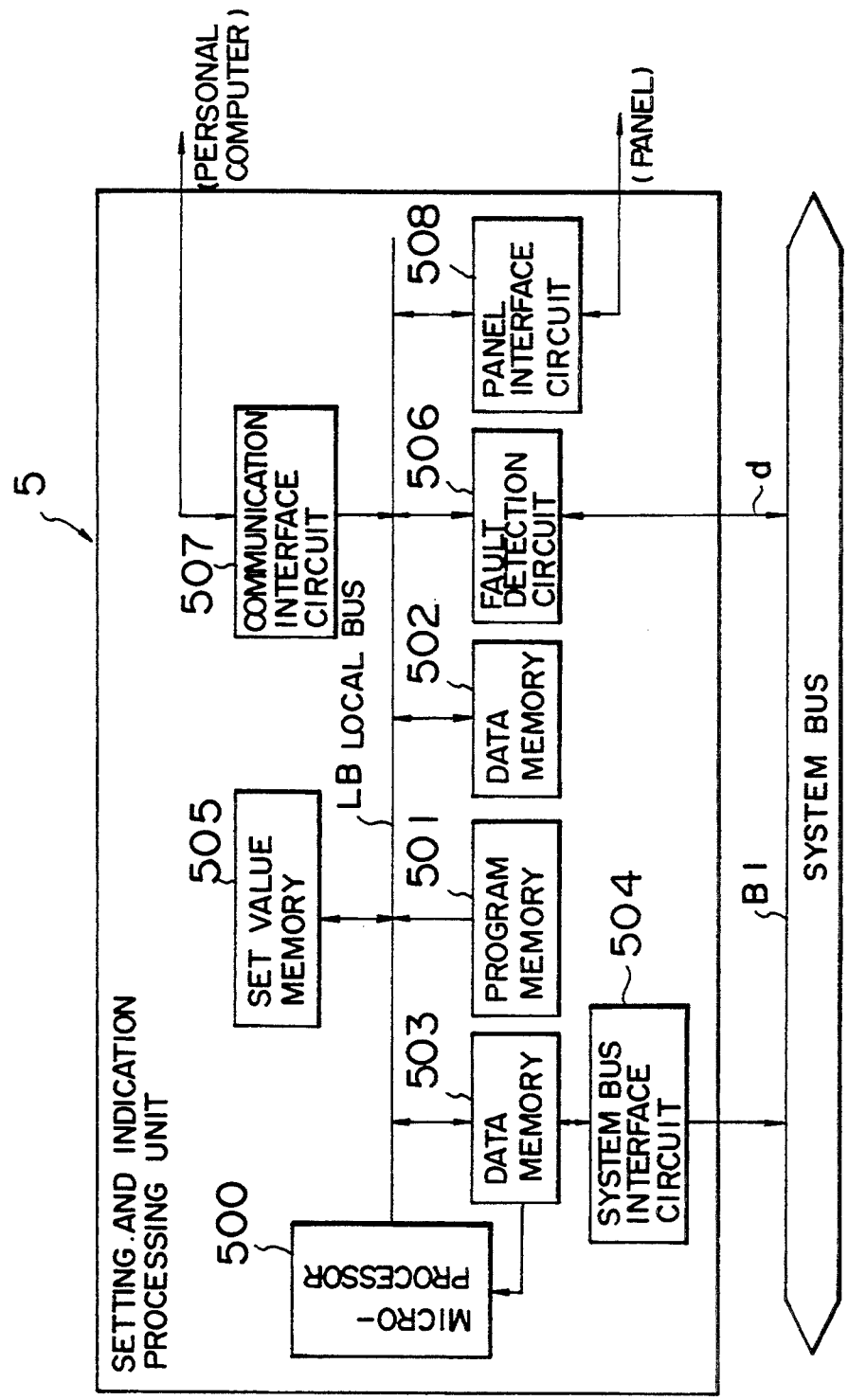
FIG. 15 is a block diagram showing a configuration of a setting and indication processing unit.
Figure 16:
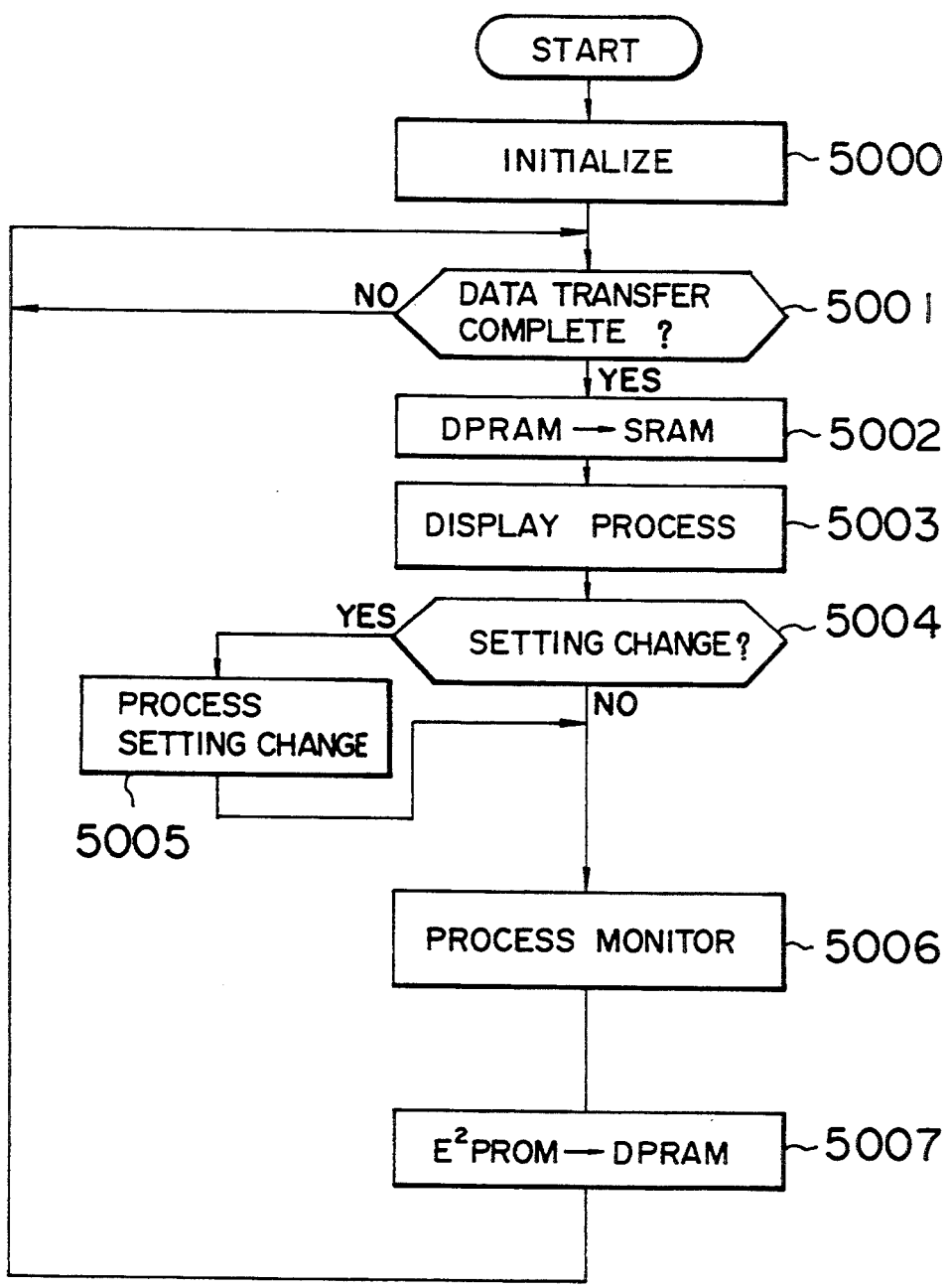
FIG. 16 is a flowchart showing the processing operation of a setting and indication processing unit.

A configuration and an outline of processing operation of the setting and display processing unit 5 (which may also be referred to simply as a setting unit) will be explained with reference to FIGS. 15 and 16. FIG. 15 shows a configuration of the setting unit 5.

In FIG. 15, numeral 500 designates a microprocessor, numeral 501 a program memory (PROM), numeral 502 a data memory (RAM), numeral 503 a dual-port data memory (DPRAM), numeral 504 a system bus interface circuit, numeral 505 a set value memory including a nonvolatile memory $E^2PROM$ for storing a set value, numeral 506 a fault detection circuit, numeral 507 a communication interface circuit with a personal computer or the like, and numeral 508 a panel interface circuit with the display panel 9 (in FIG. 1).

The processing operation of this setting unit 5 will now be briefly explained with reference to FIG. 16.

(1) In exactly the same manner as the sequence processing unit 4, after initialization (step 5000), it is decided whether all the data transfer from the system control unit 1 has been completed (step 5001).

(2) The display processing on the display panel 9 in FIG. 1 is effected (step 5003).

(3) The processing is effected for changing the set value (coefficient) from the display panel 9 in FIG. 1 (steps 5004 and 5005).

(4) The checking and monitoring in the units and mutual checking and monitoring between the units are effected in exactly the same manner as in the sequence processing unit 4 mentioned above (stop 5006).

(5) The coefficient (set value) stored in the set value memory 505 in FIG. 15 is transferred to the dual-port data memory 503 (step 5007). This is a process for enabling the system control unit 1 to transfer the set value therefrom to other units (such as the relay computation unit).

From the foregoing description, the configuration and the general processing operation of the setting unit 5 will be understood.

Finally, the functions and the general processing operation of the accident detection unit 7 shown in FIG. 1 will be explained.

The unit 7 is separated from the other units described above in consideration of system reliability. Specifically, it is not electrically connected in both input and output with any of the units explained above.

The accident detection unit performs the same processing operation as any combination of units mentioned above. As a result, as shown in FIG. 1, information from a power system is received, and the input thus received is processed in accordance with a predetermined algorithm, so that the result of processing is applied to the auxiliary relay unit 8 shown in FIG. 1 as in the aforementioned cases. Specifically, the accident detection unit 7 is for fail-safe applications. The scale of the processing operation performed by this unit is generally considerably smaller than in any combination of units mentioned above.

A configuration and the processing operation of this unit will be briefly explained below.

(1) In FIG. 1, numeral 71 designates a relay computation section of the accident detection unit 7, which is configured in the same way as the analog input unit 2 shown in FIG. 1. The following processing operations are effected:

a. The analog input A/D converted and processed in a digital filter
 b. Set value received as an input (from the party 72 described later herein)
 c. Relay computation for accident detection
 d. Diagnosis (2) In FIG. 1, numeral 72 designates a sequence processing section of the accident detection unit 7, and the processing operation thereof is briefly described below.

(a) The computation result of the accident detection relay computation section 71 is received through the I/O bus (B3) in FIG. 1 and digital input and output processing thereof.
 (b) Sequence processing for accident detection relay
 (c) Setting and display processing for accident detection relay
 (d) Diagnosis This sequence processing section 72, as will be easily understood, has the same hardware configuration as the sequence unit 4 in FIG. 1 with the digital input and output unit 6 and the display panel interface circuit packaged therein.

Each unit according to the foregoing embodiments is configured of circuit elements such as ICs mounted on a printed board. In this case, an IC or the like may be selected for each unit separately, but may be more desirably shared among the units. An embodiment of such a configuration will be explained below.

In the embodiment shown in FIG. 1, the following component elements, for example, may be shared by the analog input unit 2 and the relay computation unit 3.

1a. DSP
 1b. DSP program memory (PROM)
 1c. Dual-port data memory (DPRAM)
 1d. System bus interface circuit
 1e. Fault detection circuit
 1f. Local bus Also, in the embodiment of FIG. 1, the system control unit 1, the sequence processing unit 4 and the setting and display processing unit 5 may share the following component elements:

2a. General-purpose microprocessor
 2b. Program memory (PROM)
 2c. Data memory
 2d. System bus interface circuit
 2e. Fault detection circuit
 2f. Communication interface circuit
 2g. Local bus Further, the units 1 to 5 may share the following component elements:

3a. Program memory (PROM)
 3b. System bus interface circuit
 3c. Fault detection circuit
 3d. Local bus The aforementioned sharing is illustrative and possible in various forms taking the capacity, packaging conveniences, etc. of each element into consideration. The component elements to be shared among different units are mounted on a common printed board to which component parts not shared are added to make up each unit. As a result, it is necessary to lay out a printed board with a space for mounting common component elements and also one for carrying non-common component elements.

Further, this concept may be advanced a step further, and component elements that can be shared are appropriately combined into an LSI.

In sharing component elements, if component elements not required for a given unit are also mounted thereon, the sharing of component elements is enhanced, so that by writing a specific program into each program memory, it is possible to configure systems having the same hardware configuration but different functions. This is very preferable for system standardization and unification.

An example of the hardware configuration containing common component elements of the units will be explained below.

A general-purpose microprocessor, a PROM, a DPRAM, a RAM, a system bus interface circuit, a fault detection circuit, a communication interface circuit and a local bus make up a hardware configuration common to a plurality of units on a single printed board.

Also, a DSP, a DPRAM, a PROM, a system bus interface circuit, a fault detection circuit and a local bus make up a hardware configuration common to a plurality of units on a single printed board.

Each device used in the hardware configurations according to this embodiment is only an example, and other devices which can realize the same function may be used alternatively. For example, a dynamic RAM may be replaced with a static RAM or a PROM with an EPROM. Also, the processor may be replaced with one higher in speed or larger in processing capacity. In the case where the signal amount to be processed is small, on the other hand, a device lower in performance, but low in cost may be used instead.

In such a case, the whole system is not affected as long as there is no change in the function or performance of an input or output as related to the system bus of each unit. As a result, free designing for each unit is possible on the one hand and design change is facilitated on the other.

Specifically, according to the present embodiment, each unit may be built in the system to the extent that data input into and output from the system control unit according to a predetermined specification is possible. According to the present embodiment, therefore, units having various functions may be incorporated in the system freely, and also even after a system is built up, the units may be improved, modified or increased in number as required.

Now, the DSP (digital signal processor) making up a key component of a configuration embodying the present invention will be explained.

Figure 17:
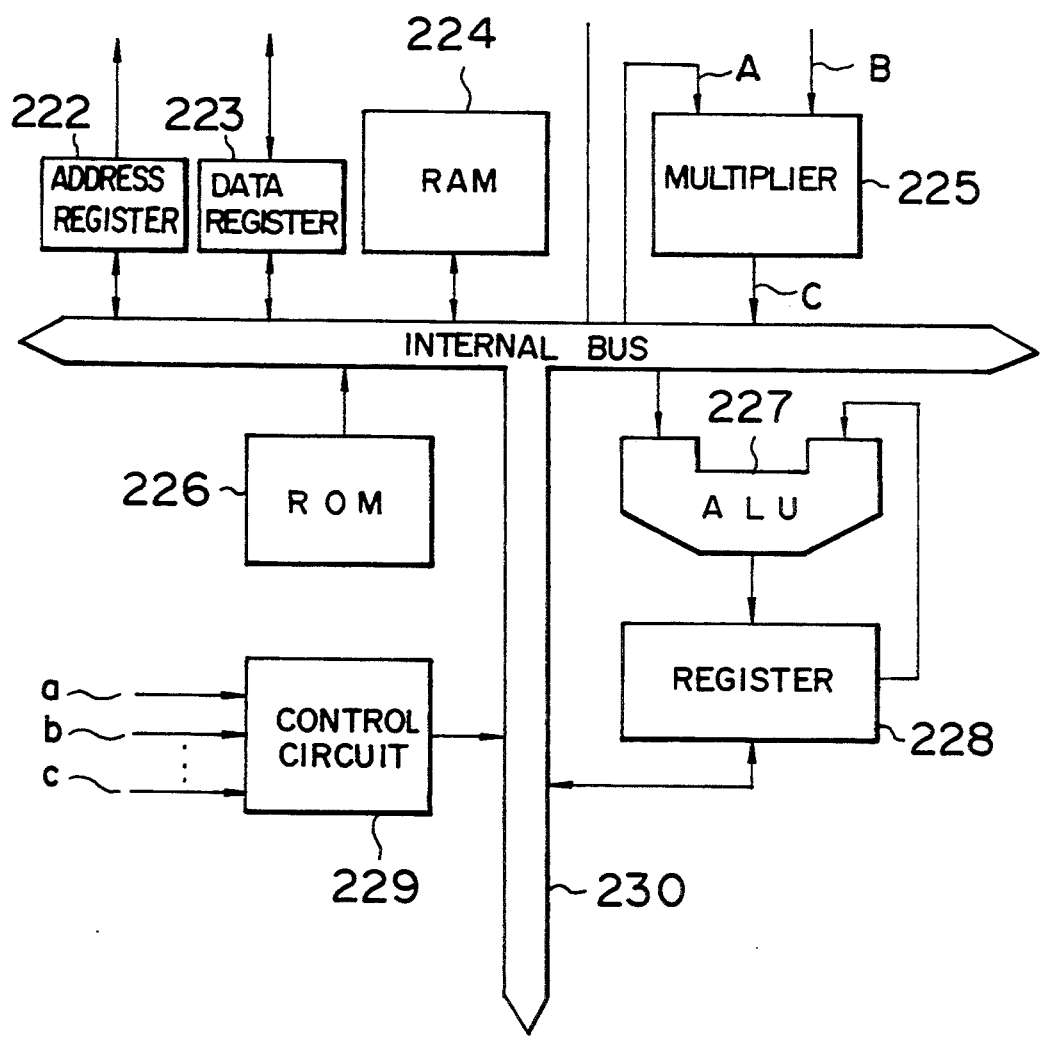
FIG. 17 is a functional block diagram showing an embodiment of a digital signal processor.

A detailed configuration of an embodiment of the DSP is shown in FIG. 17.

The DSP according to this embodiment, as shown, includes an address register 222 for designating an address in an external memory, a data register 223 used as a parallel port, a data RAM 224, a high-speed parallel multiplier 225 of m bits×m bits, an instruction ROM 226, an arithmetic logic unit ALU 227 for performing such calculations as addition and subtraction, a register 228 such as an accumulator, a control circuit 229 for controlling the interrupt or the like of a control signal (a, b or c) with an external circuit, and an internal bus 230 of the DSP.

The multiplier 225 is for multiplying the contents of the input signals A and B during one instruction cycle and applying the result C thereof to the internal bus 230.

The ALU 227 serves to add or subtract the data derived from the internal bus 230 and the register 228 to or from each other and writes the result thereof in the register 228.

The DSP has a feature in that, as well known, the sum-of-products computation is possible during one instruction cycle and the pipeline processing is available thereby to realize a high-speed numerical computation of fixed and floating point data. As a result, the input data relating to multiple input points may be processed through a filter in real time. This concept is not applicable to a general-purpose microprocessor low in processing speed.

An embodiment of the digital filter using a DSP will be explained.

Figure 18A:
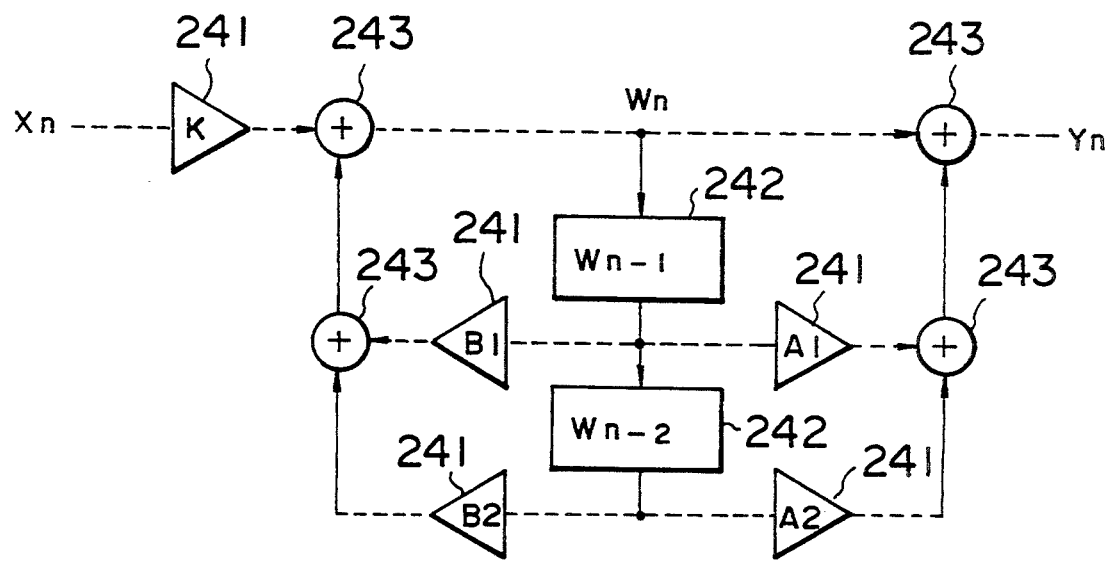
FIGS. 18A and 18B are block diagrams showing examples of the signal flow of a digital filter.
Figure 18B:
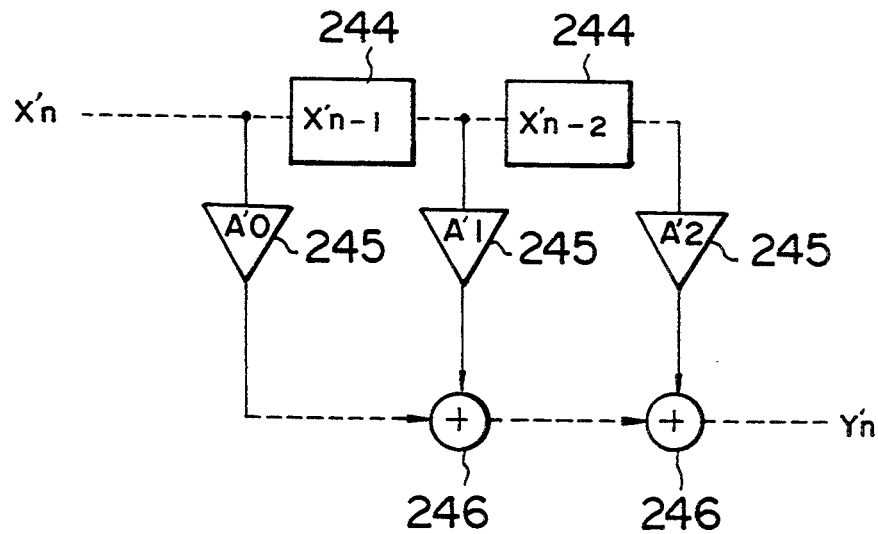

FIGS. 18A and 18B are diagrams schematically showing typical block configurations of a digital filter. FIG. 18A shows an IIR (infinite-extent impulse response) type of filter, and FIG. 18B shows a FIR (finite-extent impulse response) type of filter.

In FIG. 18A, Xn designates an input signal sign, numeral 241 a coefficient block, K a gain coefficient, $A_1$, $A_2$, $B_1$ and $B_2$ filter coefficients. Numeral 242 designates delay blocks including a one″ period delay block (Wn−1) for delaying the signal Wn by a one unit-time corresponding to one period T, and a block (Wn−2) for delaying the same signal by two unit-times. Numeral 243 designates an add block, and Yn designates filter output data.

As seen from FIG. 18A, various filters indicated by equations (5), (6), (7), (8) and (9) below are realized by regulating the filter coefficient in the shown configuration. H(z) designates a transfer function, and Z is equivalent to S of an analog system.

(Low-pass filter)
$$H(z) = \frac{1 - B_1 + B_2}{4} \cdot \frac{(1 + Z^{-1})^2}{1 - B_1 \cdot Z^{-1} + B_2 \cdot Z^{-2}} \quad (5)$$

(Band-pass filter)
$$H(z) = \frac{1 - B_2}{2} \cdot \frac{1 - Z^{-2}}{1 - B_1 \cdot Z^{-1} + B_2 \cdot Z^{-2}} \quad (6)$$

(High-pass filter)
$$H(z) = \frac{1 + B_1 + B_2}{4} \cdot \frac{(1 - Z^{-1})^2}{1 - B_1 \cdot Z^{-1} + B_2 \cdot Z^{-2}} \quad (7)$$

(Notch filter)
$$H(z) = \frac{1 + B_2}{2} \cdot \frac{1 - r \cdot Z^{-1} + Z^{-2}}{1 - B_1 \cdot Z^{-1} + B_2 \cdot Z^{-2}} \quad (8)$$

where $r = 2 \cdot \cos 2\pi f_0 \cdot T$, T is a sampling period, and $f_0$ a blocking frequency.

(All-pass filter)
$$H(z) = \frac{Z^{-2} - B_1 \cdot Z^{-1} + B_2}{1 - B_1 \cdot Z^{-1} + B_2 \cdot Z^{-2}} \quad (9)$$

In FIG. 18B, X′n designates input data, and Y′n output data. Numeral 244 designates delay blocks, of which X′n−1 is one for delaying one unit-time and X′n−2 for delaying two unit-times. Numeral 245 designates a filter coefficient block for setting the filter coefficients $A'_0$ of $A'_1$ and $A'_2$. Numeral 246 designates an add block.

This diagram may be expressed by a computation formula shown in equation (10) below.

$$y'n = A'_0 \cdot X'n + A'_1 \cdot X'n-1 + A'_2 \cdot X'n-2 \quad (10)$$

As described above, an input signal is filtered by a digital filter using a DSP according to the present embodiment. This operation is performed repeatedly for each sampling period T on the basis of a filter coefficient set in advance. As a consequence, input signals may be filtered by time division in software fashion in accordance with the number of input points, thus meeting the requirements for changing the number of input points, modification of characteristics and standardization of the printed board.

Also, since the filtering operation is possible without using an analog filter, this embodiment is completely free of factors adversely affecting the elements, such as secular or other variations in element value due to the initial value error or ambient temperature of such devices as resistors and capacitors unlike in the analog filter, thus assuring a high accuracy free of adjustment.

Also, an external checking circuit is eliminated as the need thereof is met by internal software, so that the production processes are greatly shortened, eliminating the need for maintenance, thereby leading to a higher accuracy, lower cost and other advantages of the protective relay system.

Now, an example of an automatic checking system suitably applied to the analog input section of an analog input unit according to the present invention will be explained.

(Embodiment: Automatic checking (1))

Figure 19:
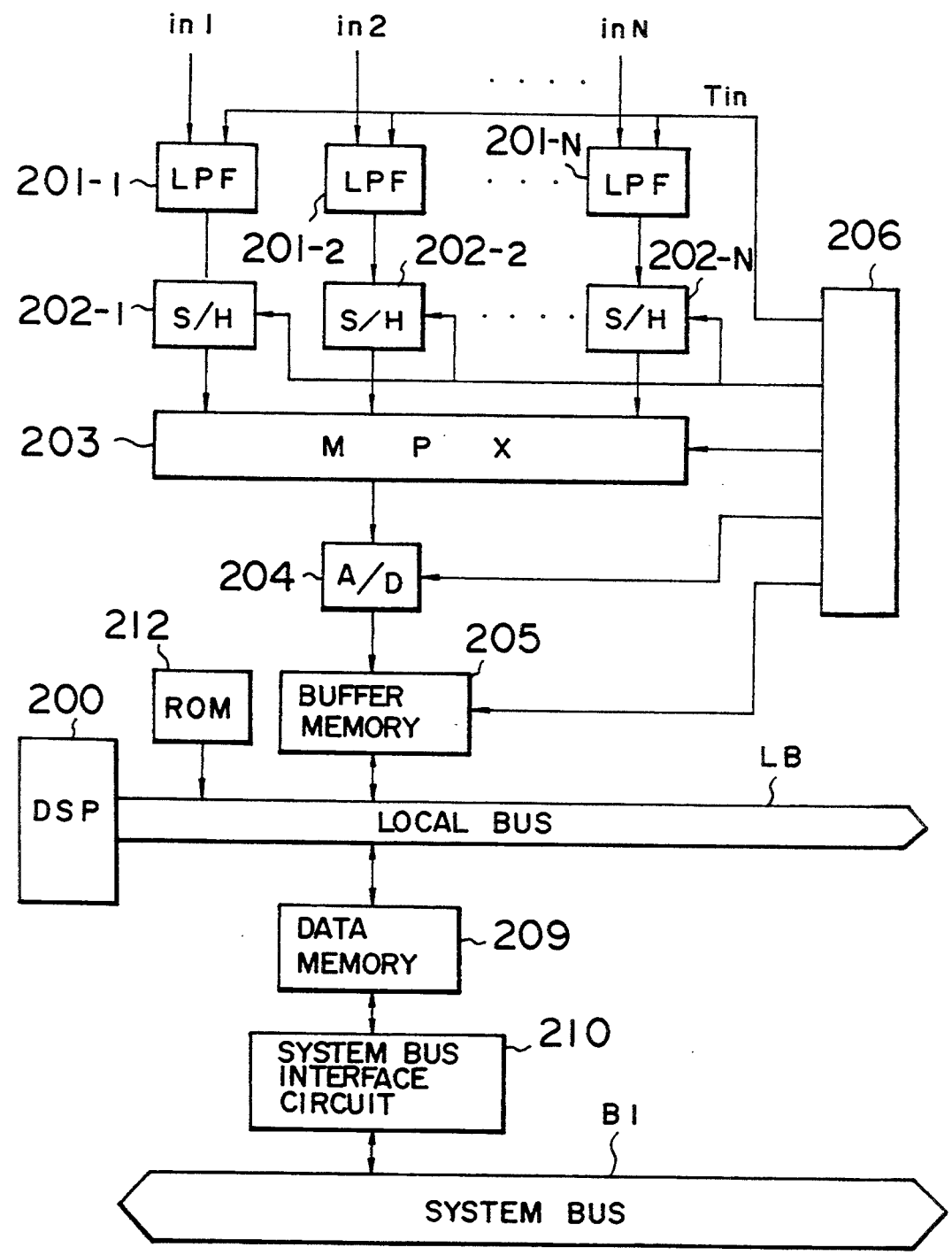
FIG. 19 is a detailed block diagram showing an analog input unit.

FIG. 19 is a diagram showing a block configuration of an automatic checking system for the analog section according to a first embodiment of the present invention.

In FIG. 19, numerals 201-1 to 201-N designate low-pass filters (mainly used for prevention of aliasing errors in sampling and hereinafter abbreviated as LPF) for removing the high harmonics superimposed on the input analog signals in1 to inN and a digital signal Tin supplied from an external source while adding these input signals to each other. Numerals 202-1 to 202-N designate sample hold circuits (hereinafter called S/H), numeral 203 a multiplexer (hereinafter called MPX), numeral 204 an analog-digital converter circuit (hereinafter called A/D converter), and numeral 205 a buffer memory for the A/D converted data using a DPRAM.

Numeral 200 designates a DSP (digital signal processor), numeral 212 a program memory (ROM) for storing DSP instructions, LB a local bus, numeral 209 a dual-port data memory for receiving data from and delivering data to the system bus, numeral 210 a system bus interface circuit, and B1 a system bus.

Numeral 206 designates a timing generation circuit for controlling the operation of the S/H circuits 202-1 to 202-N, the MPX 203, the A/D circuit 204 and the buffer memory 205 and applying a digital signal to the LPFs 201-1 to 201-N.

Figure 20:
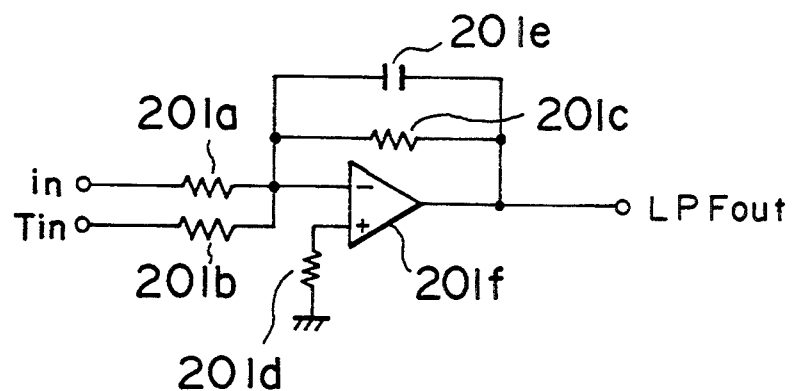
FIG. 20 is a circuit diagram of a low-pass filter in the analog input section.

FIG. 20 is a circuit diagram showing in detail the LPFs 201-1 to 201-N in FIG. 19.

In FIG. 20, numerals 201a, 201b, 201c and 201d designate resistors, numeral 201e a capacitor, and numeral 201f an operational amplifier (OP amplifier).

The above-described LPFs are for adding an analog input signal in and the digital input signal Tin to each other, and filtering these input signals to remove the high harmonics.

Now, explanation will be made about the processing sequence of automatic checking (fault detection of an analog circuit) of the analog input section according to the present embodiment with reference to the flowchart of FIG. 21.

(i) Input, combination and A/D conversion of check signal

The LPFs 201-1 to 201-N in FIG. 19 are supplied with input signals in1 to inn representing the condition amounts of the power system detected by a transformer, a current transformer or the like (normally 50 Hz or 60 Hz). Also, they are supplied with a digital signal (clock signal) of a frequency fn from the timing generation circuit 206 shown in FIG. 19. The LPFs 201-1 to 201-N function to combine these input signals while at the same time operating as an anti-aliasing filter for preventing an aliasing error caused by sampling.

The filter output is sample-held for every period T by the S/H circuits 202-1 to 202-N shown in FIG. 19.

The MPX 203 in FIG. 19 sequentially switches the outputs of the S/H circuits 202-1 to 202-N for every period T' (period 1/n the period: n is an integer) and applies the data in the S/H circuits to the A/D conversion circuit 204 shown in FIG. 19. The A/D conversion circuit 204 converts an analog amount into a digital amount and stores the result of conversion into the buffer memory 205 shown in FIG. 19.

These operations are repeated for each period T, which provides a sampling period of the digital filter.

(ii) Initialization

As an initialization step, the register and memory in the DSP 200 and the buffer memory 205 are cleared to set the initial state (step 2021a). The processes in and subsequent to (ii) are for energizing the DSP 200 by a command stored in the program memory 212.

(iii) Data input

Step 2021b transfers the input data stored in the buffer memory 205 into the DSP 200 through the local bus LB.

(iv) Filter coefficient input

Step 2021c transfers the filter coefficients stored in advance in the program memory 212 into the DSP 200. These filter coefficients include coefficients (filter coefficient group A) for passing the frequency ($f_0$: 50 Hz or 60 Hz) of the power system mentioned above to realize the characteristics for removing high harmonics, and coefficients (filter coefficient group B) for attenuating the frequency $f_0$ of the power system greatly and realizing the characteristics for passing only the frequency fn of the signal Tin applied from the timing generation circuit 206. These coefficients may be supplied through the system bus B1 from other units.

(v) Digital filter computation (1)

Several specific methods of digital filter computation are available, of which the processing operations shown by equations (11) and (12) are an example.

$$Wn = K \cdot Xn + B1 \cdot (Wn-1) + B2 \cdot (Wn-2) \qquad (11)$$

$$Yn = Wn + A1 \cdot (Wn-1) + A2 \cdot (Wn-2) \qquad (12)$$

where
K: Gain coefficient,
$A_1, A_2, B_1, B_2$: Filter coefficients
Xn: Input data,
Yn: Output data,
Wn−1: Wn data delayed by one unit-time
Wn−2: Wn data delayed by two unit-times
The filter coefficient group A is used as filter coefficients for the filter computation at step 2021d.

Figure 22A:
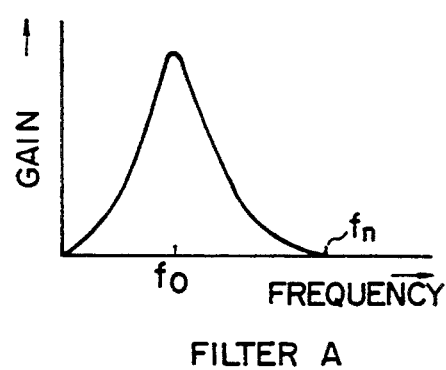
FIGS. 22A and 22B are graphs showing examples of the characteristic of a digital filter.

FIG. 22A shows an example of the gain-frequency characteristic of a filter used for the processing operation at this step. This filter passes the frequency $f_0$ and attenuates the frequency $f_n$ to such an extent as to have no effect on the protective computation.

The protective computation uses the filter output obtained at this step. As a result, the application of an input Tin of the frequency $f_n$ is of course free of any effect on the relay characteristic.

(vi) Digital filter computation (2)

The filter computation at step 2021e is exactly the same as that shown in (v) above and the same computation program is thus involved. The filter coefficient group B is used as filter coefficients.

Figure 22B:
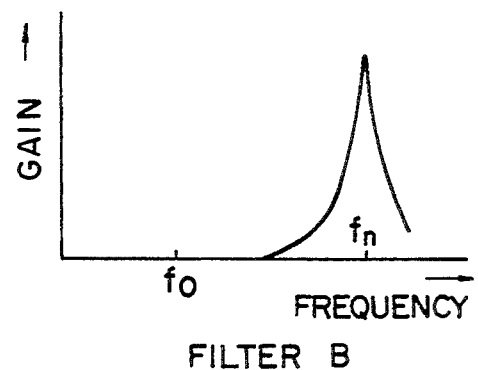

FIG. 22B shows the gain-frequency characteristic of a filter used for the processing operation performed at this step. Only the frequency component ($f_n$) of the signal applied from the timing generation circuit is passed while the other signals are attenuated. Specifically, the selectivity Q is set to a very high level. Also, another computation program may he used for this step.

(vii) Decision

Step 2021f determines the absolute value of the filter output for each channel computed at step (vi) and is compared with a known set value. As a result, within the range of a known set value, it is decided that the analog input section, that is, LPFs 201-1 to 201-N, S/H circuits 202-1 to 202-N, MPX 203, A/D conversion circuit 204 and the buffer memory 205 are operating in normal way. Outside a known set value range, on the other hand, it is known that either the analog input section or the buffer memory 205 is faulty.

According to the present invention, the aforementioned computation is effected by DSP and therefore a computation of very high accuracy is possible, thus permitting a very accurate decision.

(viii) Data output

Step 2021g transfers the filter output processed by the filter at step (v) to the system master (a unit connected to the system bus and having a system control function). This process is repeated for each period T.

The master unit for effecting the aforementioned control of the system locks a relay on the basis of the above-mentioned result of decision, while at the same time preventing a faulty operation by system fault indication. Also, since it is known that the analog input unit is faulty, the faulty portion is localized.

This operation permits high-accuracy and reliable automatic checking of the analog input section. Further, the checking of the analog input section which has thus far been difficult is made possible without any additional circuit. As a result, all the processes from data input to filter computation are effected in their entirety, thus greatly improving the system reliability.

In the above-described embodiment, the input Tin of frequency $f_n$ applied to the LPF is explained with reference to a case where the input is applied from the timing generation circuit. According to the present embodiment, the input Tin of LPFs 201-1 to 201-N may be supplied, not from the timing generation circuit, but as an output of an oscillation circuit separately inserted with equal effect, as easily understood.

Figure 23A:
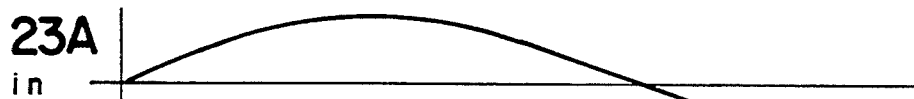
FIGS. 23A–F show waveforms produced at various parts when a first method of automatic check and monitoring is executed for the analog input section.

FIGS. 23(a) to 23(f) show waveforms produced at various parts of the embodiment under consideration. FIG. 23(a) designates an input signal of the power system, FIG. 23(b) a clock input signal, FIG. 23(c) output waveforms of LPFs 201-1 to 201-N, FIG. 23(d) output data of the digital filter A, FIG. 23(e) output data of the digital filter B, and FIG. 23(f) output data determined as an absolute value of the output data of the digital filter B.

Figure 23B:
Figure 23C:
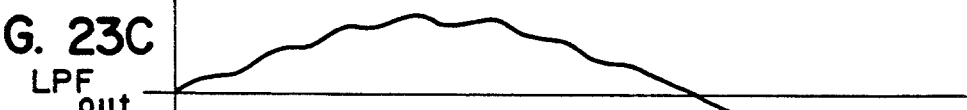
Figure 23D:
Figure 23E:
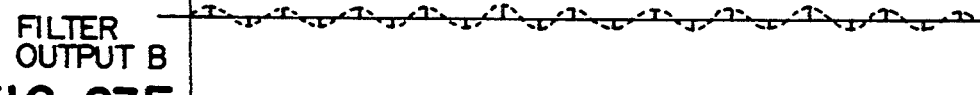
Figure 23F:

Although the aforementioned embodiment concerns a case in which the clock signal Tin shown in FIG. 23(b) is applied to the LPFs 201-1 to 201-N, not only the clock signal, but also a sinusoidal wave signal or the like may be applied with equal effect, as easily understood.

(Embodiment: Automatic checking—(2))

Unlike in the above-described embodiment in which a given clock signal is applied to the LPFs shown in FIG. 19, the embodiment explained below has a DC signal applied to the LPFs for automatic checking.

Figure 21:
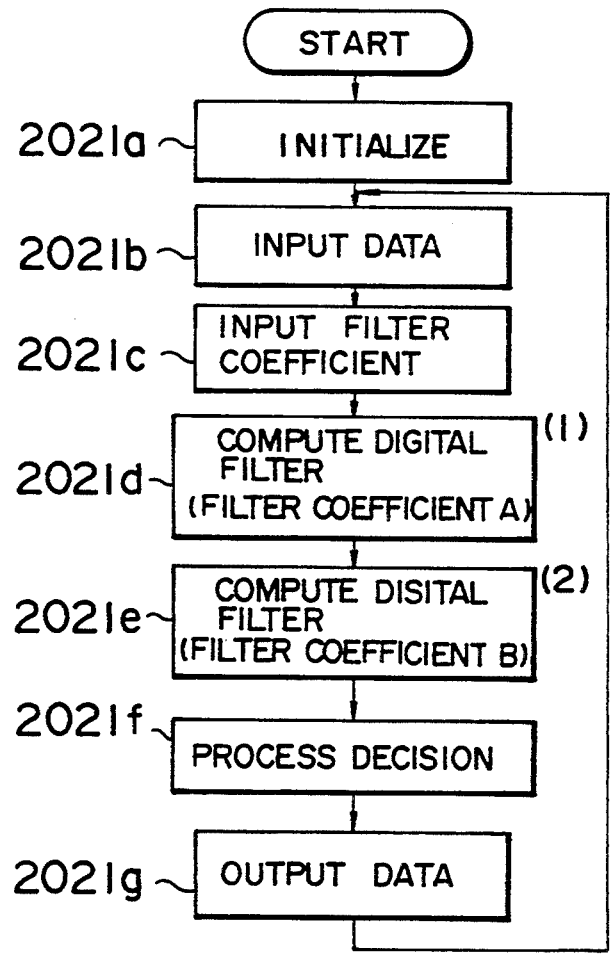
FIG. 21 is a flowchart showing the processing operation of the analog input section.

This embodiment has the same circuit configuration and processing flow as those shown in FIGS. 19 and 21.

FIG. 24A shows exactly the same frequency-gain characteristic as the filter shown in FIG. 22A. FIG. 24B shows the frequency-gain characteristic of a low-pass filter (a digital filter C using the filter coefficient group C). As a result, the difference of this embodiment from the aforementioned ones lies in the filter characteristic of step 2021e (Filter B replaced by filter C).

Now, the operation of this embodiment will be explained.

First, one of the two input terminals of the LPFs 201-1 to 201-N is supplied with an input signal in from the power system shown in FIG. 25(a), and the other input terminal thereof with an input signal Tin' making up a DC voltage of Vref in magnitude shown in FIG. 25(b). As explained above, the outputs of the LPFs 201-1 to 201-N shown in FIG. 19 take the forms as shown in FIG. 25(c).

Specifically, the waveform is such that Vref is added to the input signal from the power system.

Now, the DC portion of the filter output to which the filter coefficient group A is applied is cut off as shown in FIG. 25(d). As a result, the DC portion of the filter a applied to the protective relay computation is cut off, and therefore the effect of the application of a DC signal input that would otherwise have on the protective relay computation is eliminated entirely.

FIG. 25(e) shows an output of the filter C. As seen from this diagram, if the analog input section explained above operates normally, the DC portion (Vref in magnitude) applied as an input is faithfully produced as shown in FIG. 25(e).

It is, however, easily understood that the output of the filter C may be multiplied in gain to a desired degree.

In the case where the analog input section described above is not operating in normal way, on the other hand, the output magnitude of the filter C is not Vref, and therefore a circuit fault is detected earlier (with a delay only as much as a delay in the transient response of the filter C), thus greatly improving the reliability.

FIGS. 26(a) and 26(b) are diagrams for explaining the embodiment under consideration more in detail. FIG. 26(a) shows an output of the filter C, and FIG. 26(b) shows a DSP processing.

Assume that the analog circuit operates normally before time point Tf, and a circuit fault has occurred at time point TF.

At time point TF+$\alpha$ several samples later, the magnitude of the filter output is not Vref. As a result, a fault of the analog circuit should be capable of being detected at that time point. Specifically, a high-speed automatic checking is of course realized.

(Embodiment: Automatic checking—(3))

Still another embodiment will be explained. This embodiment, like the one explained above, has a circuit configuration and a computation flow similar to those shown in FIGS. 19 and 21. This embodiment, however, is different in the coefficients of the filter at steps 2021d and 2021e and the input signal Tin applied to the LPFs 201-1 to 201-N shown in FIG. 19.

FIG. 27A is a diagram showing an example of the frequency-gain characteristic of a filter used for passing the frequency $f_0$ of the power system and effecting the protective relay computation.

(The filter coefficient group D is used)

The above-mentioned filter characteristic is such that the input of frequency $f_n'$ is zero.

FIG. 27B is a diagram showing an example of the gain-frequency characteristic of a filter E (filter coefficient group E) for cutting off the frequency component $f_0$ of the power system and passing only the frequency component $f_n'$ of the applied signal in contrast with the case of FIG. 27A.

Thus the filter having the characteristic shown in FIG. 27A which cuts off the input Tin of frequency $f_n'$ has no adverse effect on the protective relay computation.

Now, the operation of the present embodiment will be explained.

FIG. 28(a) shows an S/H signal for sampling the filter. FIG. 28(b) is a diagram showing an input signal Ti' providing an input waveform applied to the LPFs 201-1 to 201-N shown in FIG. 19.

The S/H signal is synchronized in timing with the Ti input signal. Specifically, the input signal Ti' has a period n times (n: Integer) as large as the period of the S/H signal. Also, the input signal Ti' has a clock waveform oscillating between positive and negative sides.

An output waveform of the filter D described above is shown in FIG. 28(c). This filter output assumes a waveform responsive only to the input signal Ti' due to the filter characteristic described above, and under normal operation of the analog input section, is identical to the known data at the time points designated in FIG. 28(d). Specifically, since the S/H signal is in phase with the Ti input signal, the DSP 200 in FIG. 19 is informed of the number of processings it has been engaged in from the point of polarity change of the input signal Ti' and thus the output thereof is known in advance In view of this, if the filter output is compared with the known data corresponding to the sampling time point, a fault of the analog circuit is discriminated at an early time quickly by use of the DSP.

As a result, a quick fault detection is possible for every sampling period of the filter, and therefore the protective relay system can be locked to prevent a false operation at the time of a fault of the analog input section.

Also, according to the present embodiment in which an input oscillated between positive and negative sides, as shown in FIG. 28(b), the checking of the A/D conversion circuit considered very important in the prior art is also performed, thus eliminating an additional checking circuit exclusive to the A/D conversion circuit. As a result, the circuit is reduced in size and improved in reliability.

In respect of the operation flow shown in FIG. 21, on the other hand, the filter computation for checking, if limited in computation time, may be effected in time division, but not for every period of filter computation.

The aforementioned embodiment for automatic checking of the analog input section eliminates the need of an additional circuit for automatic checking and permits an accurate fault detection at an early time, thus improving the reliability as a protective relay system.

Further, even at the time of an accident in the power system, the application of a high-frequency signal which otherwise might not be generated under an accident condition and the detection of a response to such an input are used for automatic checking, so that a high-accuracy automatic checking is possible regardless of whether a system accident has occurred or not. It is thus possible to realize a very reliable protective relay system as compared with the conventional systems, thereby leading to a great advantage.

The automatic checking of the analog input section is applicable not only to an analog input unit used for a power signal processing system, but also to a circuit generally used for converting an analog signal into a digital signal with equal effect.

Apart from the above-described embodiments in which the signal processing system according to the present invention is applied to a protective relay system, the system according to the present invention may also be applied to other fields, such as a reactive power compensation system, or more preferably to a control means for a static-type reactive power compensation system.

The signal power processing system according to the present invention may find an application, for example, in a control system for controlling the on-off timing (phase angle of $\alpha$) of a thyristor with reactor current in the case of a TCR system combining a reactor with a thyristor.

In the case of a TSC system having a power capacitor and a thyristor switching unit for the capacitor, on the other hand, the system according to the present invention is applicable to a control system for on-off control of the thyristor.

In this way, in a static-type reactive power compensation system, the data, such as a voltage change of the system or the like, is computed at high speed by a predetermined algorithm using a parameter set in advance to control the thyristor. Also, the change rate ($\Delta V$) of the system voltage is detected, and on the basis of this detection, the system voltage is stabilized. Further, the change rate of the effective power ($\Delta P$) or the frequency ($\Delta f$) of the system is added as an auxiliary signal to dampen power fluctuations.

In operating a static-type reactive power compensation system, therefore, the control unit has necessary functions of processing various input data representing the system conditions and the above-mentioned high-speed computation. Other functions added as required include the sequence processing forming control information based on the computation result and an auxiliary relay function for converting the control data into a predetermined level and producing the same data. Further, the setting and indication processing function is required as a man-machine interface.

These functions are realized by a system equivalent to the signal processing system shown in FIG. 1. Such a system is of course different from the protective relay system in the processor program of each unit. Also, a fault detection unit is not required in this case, too. Now, another example of a power system control and protective system to which the signal processing system according to the present invention is applicable will be described. The application of the present invention is not of course limited to the described example.
(System control)
 (1) System stabilization system
 (2) Automatic restoration system
 (3) Voltage reactive power control system
 (4) Power substation automatic operating system
 (5) System checking system
 (6) Fault point plotting system
 (7) Automatic operation recording system
(System protection)
 (1) Protective relay system for power transmission line
 (2) Bus protection relay system
 (3) Step-out detection and system separation system
 (4) DC power transmission control and protection system The signal processing system according to the present invention is of course applicable also to a power transmission line, bus, transformer, generator, voltage stabilizer, static-type reactive power compensation system, etc. in a wide range of the power system from 500 kV to 66 kV, as well as a lower voltage range.

According to the aforementioned embodiments of the present invention, all or parts of the effects (1) to (5) described below are realized depending on the form of the invention.

(1) The units may be added or exchanged tn realize a compact, highly reliable digital protective system or control system with multiple and sophisticated functions. That is to say, it is possible to realize a system and apparatus superior in expandability and versatility.

(2) The digital filter processing using a DSP realizes a great reduction in size, improvement in reliability and stabilization of the analog input section. At the same time, with a great reduction in quantization error of the digital filter, the characteristics of the control and protective relay systems are remarkably improved in accuracy with the need of adjustment eliminated.

(3) The high-speed processing of the control and protective computation permits the processing of a multiplicity of sophisticated functions for an improved performance (high accuracy and operating speed). In addition, such functions are realized with a small hardware volume, thus leading to a compactness, an improved reliability and a lower cost.

(4) A fault is detected by a unit and thus is localized more easily. Also, the easy maintenance and repair work produces a system which is easy to operate.

(5) The need for checking the analog input section is eliminated, thus greatly reducing the size of the system and saving the software processing for checking at the same time. As a result, the maintenance is not required, resulting in the great advantages of higher accuracy and lower cost of the system.

Furthermore, the elimination of the need for automatic checking also eliminates the down time of the system, thus realizing a very reliable system.

Still another embodiment of the present invention will be explained with reference to FIGS. 29 to 37.

A general configuration of a digital protective relay system according to still another embodiment of the invention is shown in FIG. 29. The protective relay system comprises an analog input unit 2, a system control unit 1, a relay computation unit 3, a general-purpose system bus B1 and a setting panel 55 connected to the system control unit 1.

The analog input unit 2 is for taking in the input data (including the voltage and current data of the power transmission line) representing the condition amounts of the power system and processing then as an input in a predetermined manner. A plurality of the input data are introduced to an A/D converter 254 through a buffer amplifier 251, a sample holder (S/H) 252 and a multiplexer (MPX), and after being converted into a digital value by the A/D converter 254, is supplied through a system bus interface circuit 255 to a system bus B1.

The system control unit 1, on the other hand, is for data transfer between the units, sequence processing for the protective relay, input and output processing with external units, and input processing of a relay set value. The system control unit 1 thus includes a microprocessor (MPU) 100, a program memory 102, a data memory 103, a system bus interface circuit 110, a communication interface circuit 109 with external units, a relay-setting interface circuit 111 and a local bus LB connected therewith. The relay-setting interface circuit 111 is connected with the setting panel 55.

The relay computation unit 3 takes in the input data processed at the analog input unit 2 and the contents associated with the relay characteristics, such as the relay set value supplied from the setting panel 55, and executes the protective relay computation in accordance with a predetermined computation program to decide on the presence of a fault or not, while producing the result thereof. This relay computation unit 3 includes a digital processor (DSP) 300, a DSP program memory 301, a data memory (RAM) 305, a dual-port data memory 302 and a system bus interface circuit 303.

Figure 30:
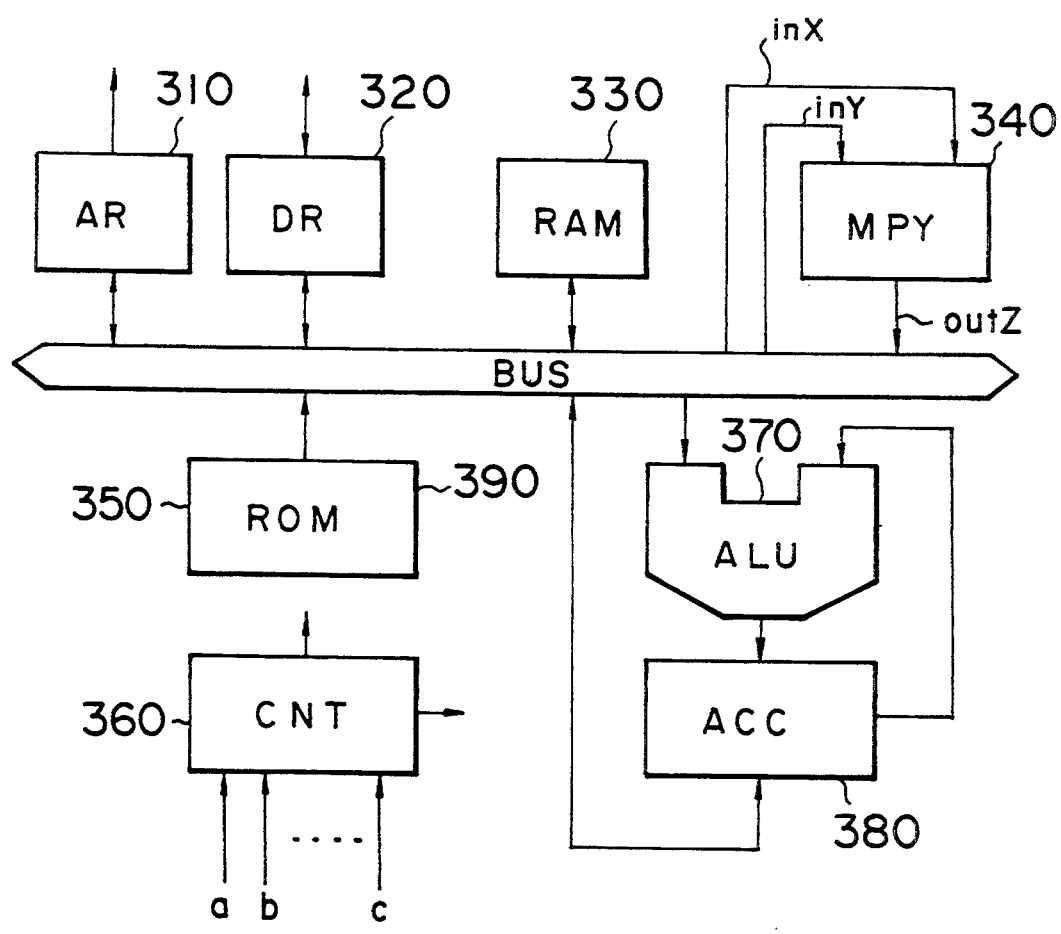
FIG. 30 is an internal block diagram of a digital signal processor.

The interior of the DSP 300 is configured as shown in FIG. 30. In FIG. 30, numeral 310 designates an address register for designating an address in an external memory, numeral 320 a data register, numeral 330 a data RAM, and numeral 340 a high-speed parallel multiplier of n bits x n bits. The high-speed parallel multiplier 340 is for multiplying the input data inX and inY applied thereto during one instruction cycle, and producing the result outZ thereof.

Numeral 350 designates an instruction ROM storing the program for controlling the data input and output and the processing operation of the DSP, numeral 360 a control circuit for controlling the interruption such as the control signals a and b connected with an external circuit, numeral 370 an ALU (arithmetic logic unit) for making such calculations as addition or subtraction, numeral 380 an accumulator, and numeral 390 an internal bus of the DSP (data bus and address bus).

The features of the DSP lie in that, as mentioned above, the sum-of-products computation is possible at high speed during one instruction cycle and that pipeline processing is possible, thus realizing a high-speed numerical computation of fixed or floating point data.

The processing operation of a protective relay related to the features of the present invention will be specifically described below.

Figure 31A:
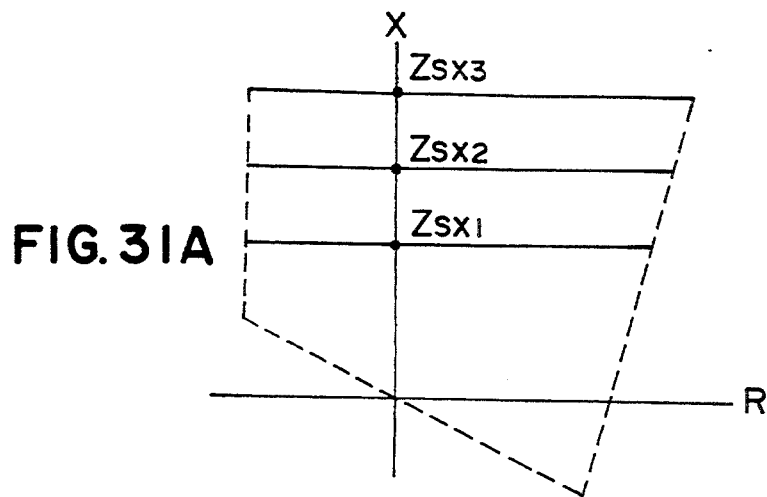
FIGS. 31A–C are diagrams showing examples of the characteristic of a protective relay.
Figure 31B:
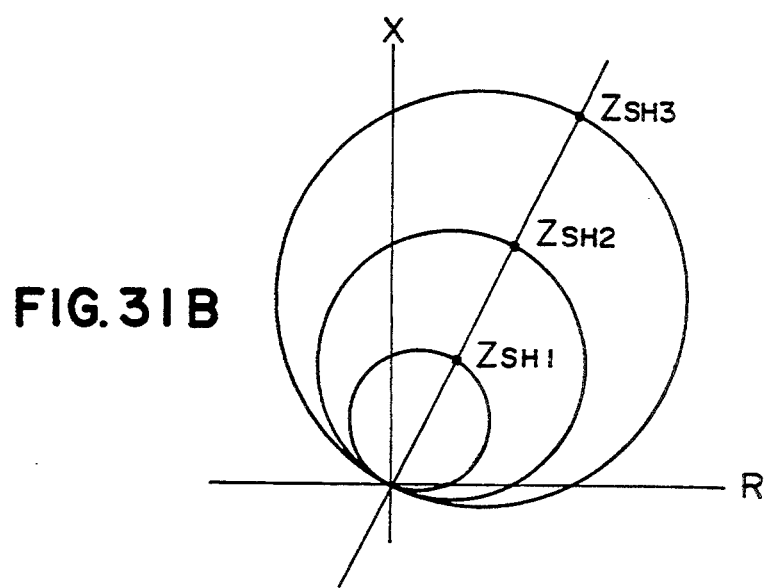
Figure 31C:
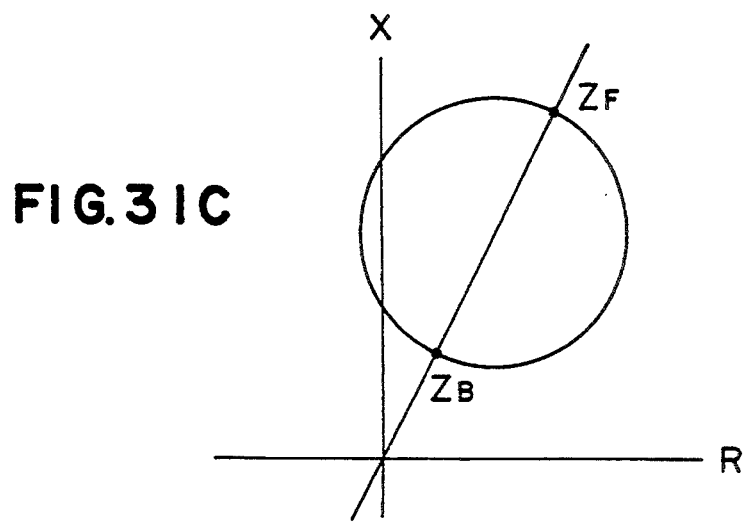

Characteristics of three types of protective relay are shown illustratively in FIGS. 31A, 31B and 31C. These characteristics are well known.

FIG. 31A shows the characteristic of a reactance relay, in which $Z_{SX1}$, $Z_{SX2}$ and $Z_{SX3}$ are set values in first to third stages. The computation formula for this relay is well known, and is given by the following equation for the first stage:

$$\sum_{n=1}^{N} \{(I \cdot Z_{SX1} - V)(I \cdot Z_{SX1})\} > K_1 \quad (13)$$

where V is the voltage, I the current, $K_1$ a constant, n the number of sampling points and N the range of n.

The characteristic of a mho relay is shown in FIG. 31B, in which $Z_{SH1}$, $Z_{SH2}$ and $Z_{SH3}$ indicate set values for the first to third stages, respectively. The computation formula for this relay is well known, and is expressed as shown below for the first stage.

$$\sum_{n=1}^{N} \{(I \cdot Z_{SH1} - V) \cdot V\} > K_2 \quad (14)$$

FIG. 31C shows the characteristic of an offset mho relay, in which $Z_F$ is a forward set value and $Z_B$ a rear set value. The computation formula for this relay is well known, and is expressed by the equation below.

$$\sum_{n=1}^{N} \{(I \cdot Z_F - V)(V - I \cdot Z_B)\} > K_3 \quad (15)$$

As described above, the contents of the computation formula are varied from one protective relay to another. If coefficients $k_1$, $k_2$, $k_3$, $k_4$ and $k_r$ freely settable are used together with set values $Z_1$ and $Z_2$ which are also freely settable, however, the computation formulae for the protective relay mentioned above are standardized as shown by equation (16) below.

$$\sum_{n=1}^{N} \{(k_1 \cdot I \cdot Z_1 - k_2 \cdot V)(k_3 \cdot V - k_4 \cdot I \cdot Z_2)\} \cdot k_5 \cdot K \quad (16)$$

FIG. 32 shows a combination of the values of the coefficients $k_1$ to $k_s$ for realizing the computation formulae given by equations (13) to (15). If the setting is $k_1=k_2=k_5=1$, $k_3=0$ and $k_4=-1$, for example, the processing operation of the reactance relay given in equation (13) is reached. In similar fashion, if the setting is $k_1=k_2=k_3=k_5=1$ and $k_4=0$, on the other hand, a mho relay given in equation (14) is realized. Also, an offset relay is obtained if the setting is $k_1$ to $k_5=1$. Though not shown in the diagram, an over-current relay or a short-voltage relay is also realizable in a similar manner.

Specifically, according to the present embodiment, a computation program relating to the protective relay is prepared by use of the standard formula of equation (16), and the particular program is stored in the ROM 350 in the DSP 300. At the same time, the constants associated with the relay characteristics including the set values $Z_1$, $Z_2$ and the coefficients $k_1$ to $k_5$ are supplied from outside as a data, so that a plurality of types of protective relay computation processings are effected by a single computation program.

As compared with using individual computation formulae shown in equations (13) to (15), the use of the standard equation (16) increases the multiplications. By using the DSP 300 capable of multiplication processing higher in speed by one digit or more than the MPU, no problem is posed°

Figure 33:
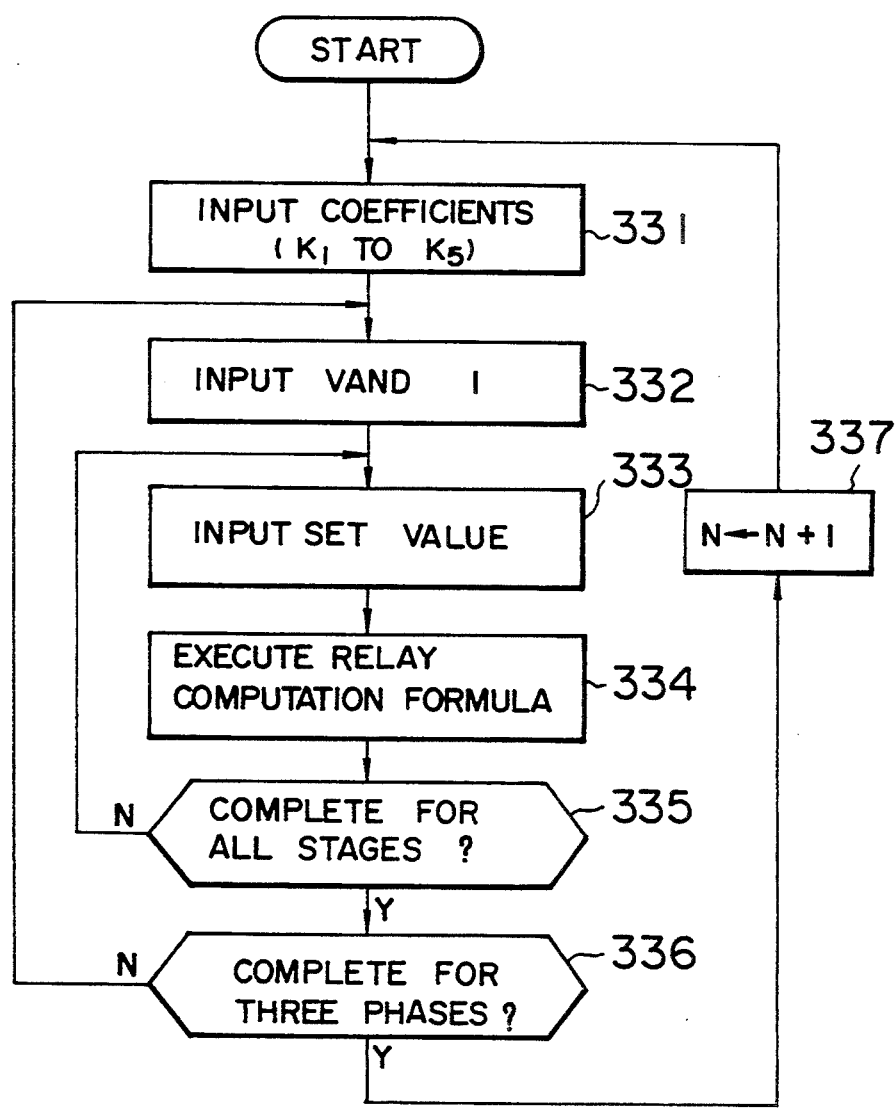
FIG. 33 is a flowchart showing a sequence of protective relay computation according to an embodiment of the present invention.

Now, explanation will be made specifically for an example of a protective relay computation processing of a reactance relay (three stages) based on the standard equation (16) with reference to the processing flowchart of FIG. 33.

First, step 331 applies the coefficients $k_1$ to $k_5$ (FIG. 32) set corresponding to the reactance relay to the DSP 300 making up protective relay computation means. Then, step 332 applies voltage and current data Va and Ia of phase a, for instance, for all the input data. Step 333 applies the relay set value $Z_1=Z_2=ZSX1$ for the first stage. As a result, all the conditions required for the computation of phase a have been applied. Step 334 executes the protective relay computation in accordance with the stand&rd equation (16). The next step 335 decides whether the computation up to the third stage of the reactance relay has been finished or not. Since only the first stage is finished, the process returns to step 333 to apply the set value $Z_1=Z_2=Z_{SX3}$ of the second stage. Step 334, as in the first stage, then executes the computation in accordance with the standard equation (16).

In this way, steps 333 to 335 are repeatedly executed up to the third stage. In the third stage, the set value of $Z_1=Z_2=ZSX3$ is applied.

Upon completion of the third stage, the process proceeds to step 336 for deciding whether or not the protective relay computation for the three phases a to c has been finished. If phase b or c is not finished, the process returns to step 332 for applying the input data Vc, Ic or Vb, Ib for phase b or c, and the computation from the first to third stages is executed sequentially as in the above-mentioned case. If the answer at step 336 is affirmative, the process proceeds to step 337 for stepping the sampling time forward in preparation for the next sample data.

Figure 34:
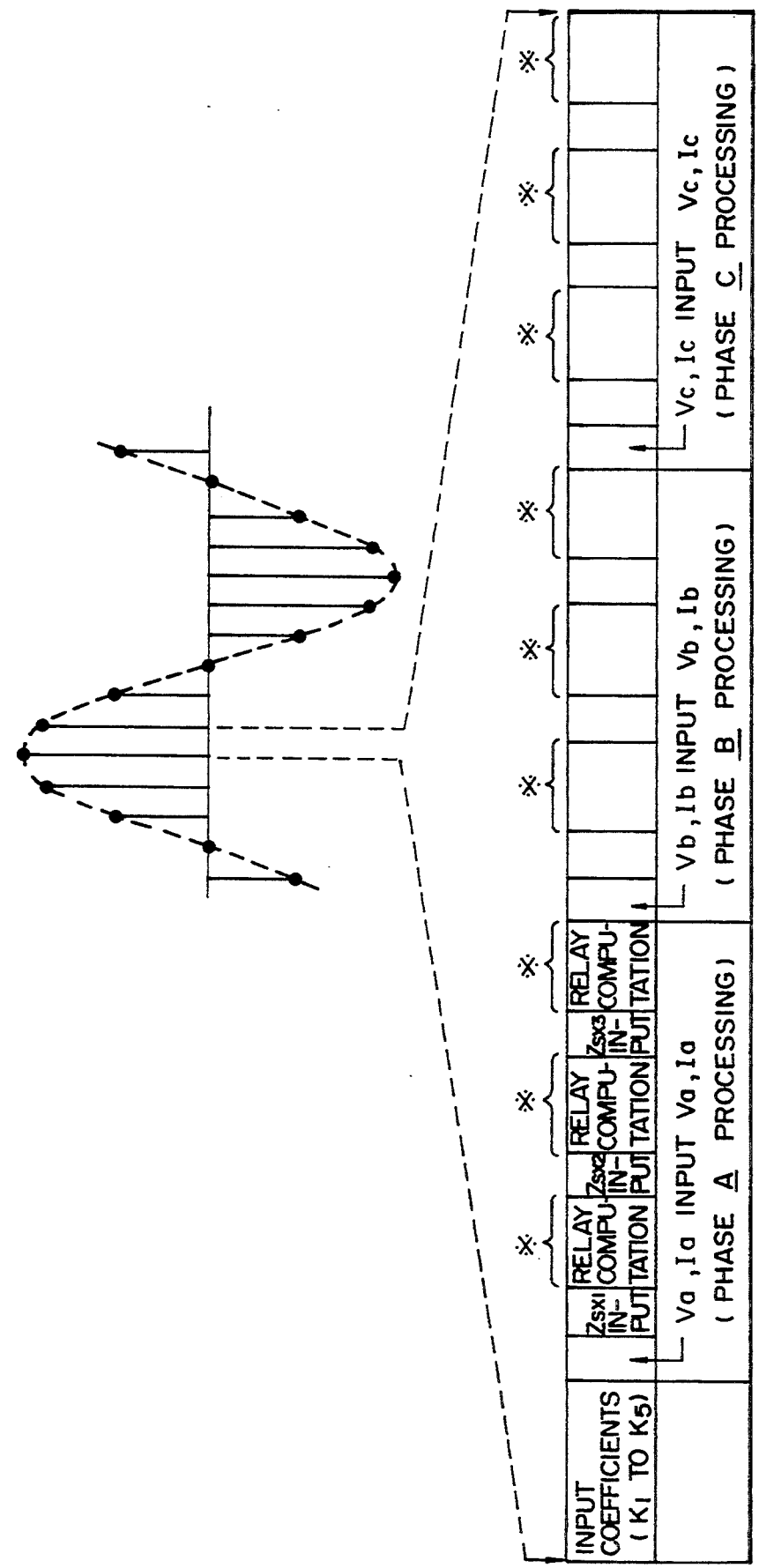
FIG. 34 is a timing chart for the flowchart shown in FIG. 33.

A time chart for the aforementioned computation sequence is shown in FIG. 34. In FIG. 34, the abscissa represents the time axis, the time zone marked with , represents the one for executing the protective relay computation corresponding to step 334. This computation is for executing the standard equation (16), that is, executing exactly the same program repeatedly.

As described above, the coefficients $k_1$ to $k_5$ and the relay set values $Z_1$ and $Z_2$ for realizing the desired functions of the protective relay are supplied to the DSP 00 as data similar to the input data. In the process, a program is stored in the data memory 305, the dual-port data memory 302 or the RAM 330 in the DSP 300 in FIG. 29, which program is taken into the DSP 300. Various methods are conceivable for storing the data in these memories. According to the embodiment shown in FIG. 29, the coefficients $k_1$ to $k_5$ and the set values $Z_1$, $Z_2$ are applied and set through the system control unit 1 from the setting panel 55 arranged outside.

FIG. 35 shows the manner in which the coefficients and set values relating to three stages of reactance relay, together with input data, are stored in a predetermined area in the memory. In the case where the function of executing the three-phase processing of three stages of the mho relay shown in FIG. 31B is given, the values of the corresponding coefficients shown in No. 2 of FIG. 32 are stored in the areas of the coefficients $k_1$ to $k_5$, and the three stages of $Z_{SH1}$, $Z_{SH2}$ and $Z_{SH3}$ shown in FIG. 31B in the area of the set value $Z_1$. In similar fashion, Ln the case where the function is given of an offset mho relay as shown in FIG. 31C, the values shown in No. 3 of FIG. 32 are stored as the coefficients $k_1$ to ks, and the set values $Z_1=Z_F$, $Z_2=Z_B$ in corresponding areas respectively. In this case, the offset mho relay makes up one element, and each of $Z_1$ and $Z_2$ one element, respectively.

As described above, according to the present embodiment, the computation formulae relating to various types of protective relays are presented as a standard equation like (16), and the coefficients $k_1$ to $k_5$ for this standard equation are applied as an input and set as external data, while at the same time applying and setting relay set values from an external circuit, thus effecting the desired protective relay computation. As a result, various types of protective relays are realized by the same computation program. Specifically, the standard equation (16) remains unchanged for all the protective relays or relay set values, and therefore a computation program may be fixed and used as a subroutine. In configuring a protective relay system, therefore, the program capacity requirement is reduced by about one digit as compared with the conventional system having different computation programs for different relays, thus improving the software productivity.

Figure 36:
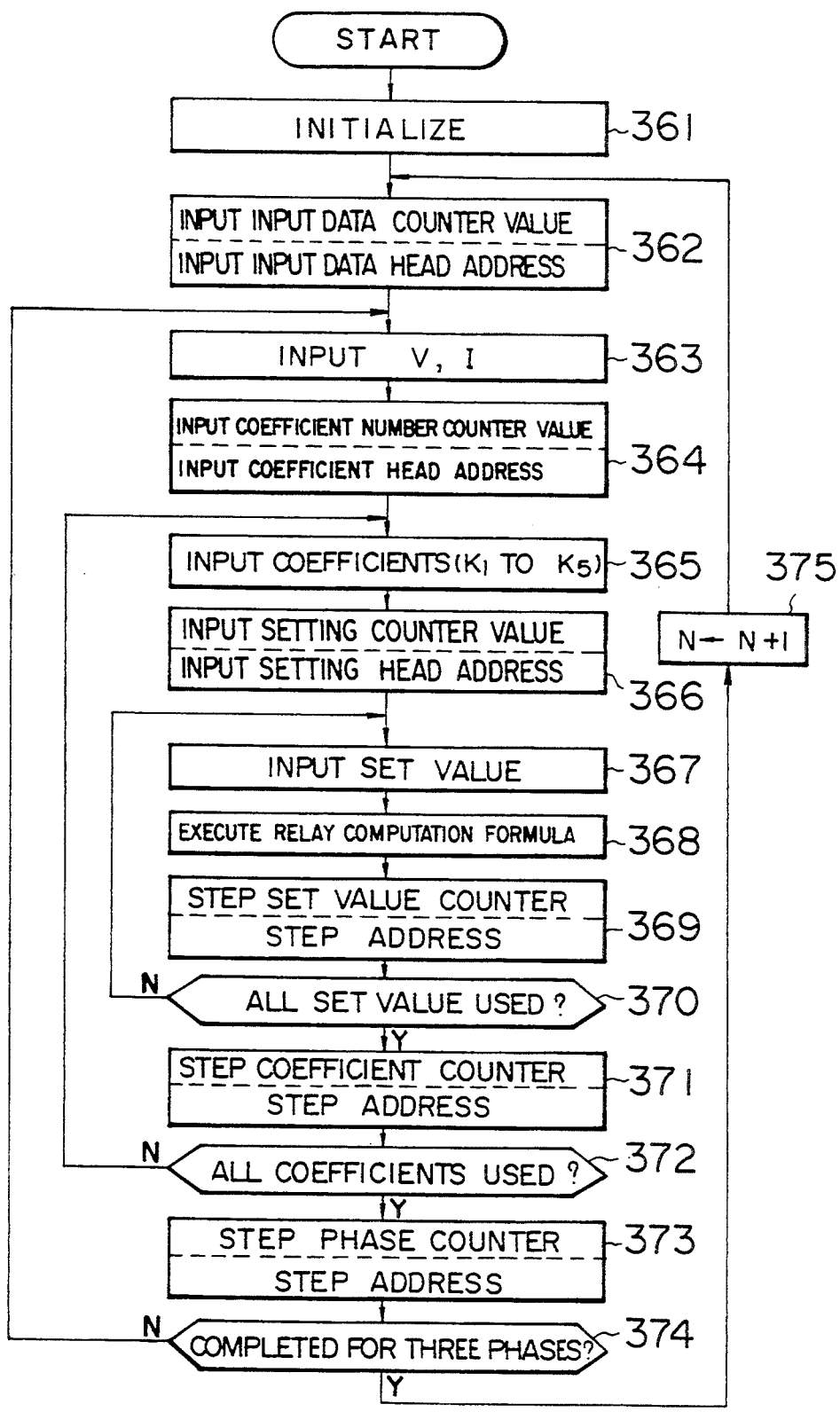
FIG. 36 is a flowchart showing a sequence of the protective relay computation according to another embodiment.
Figure 37:
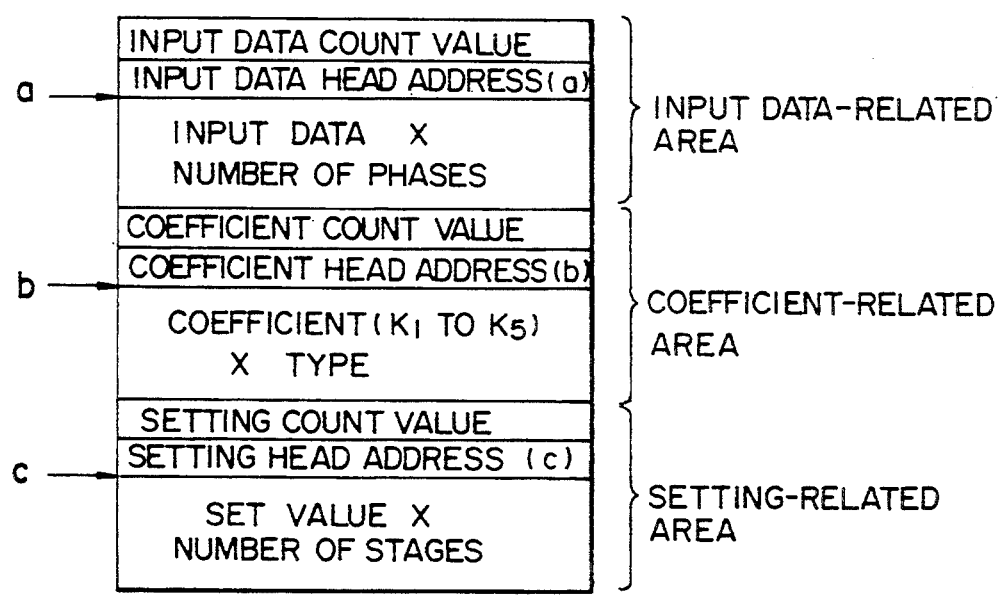
FIG. 37 is a diagram showing the contents of a data memory according to the embodiment shown in FIG. 36.

FIG. 36 shows a processing sequence for realizing several types of protective relay functions by the protective relay system shown in FIG. 29. Specifically a plurality of coefficients $k_1$ to $k_5$ corresponding to a plurality of types of protective relays and a plurality of set values $Z_1$, $Z_2$ corresponding to a plurality of stages of each relay are determined, so that these protective relay computations are executed for three phases at a time by a single computation program (standard equation). FIG. 37 shows the contents of a RAM storing input data, coefficients, set values, etc. required for the protective relay computation. As shown in this diagram, the memory areas are divided into an input data-related area, a coefficient-related area and a set value-related area, which areas are respectively adapted to store (1) the number of input data, such as the number corresponding to three phases), head addresses of input data and input data group, (2) the number of types of coefficients (number corresponding to the number of types of protective relays), head addresses of the coefficients, coefficients (by type of protective relay), and (3) the number of set values (such as the number of stages), head addresses of the set values, and set values (by the type of protective relay).

Now, the sequence of computation processing of the protective relays will be explained with reference to the flowchart of FIG. 36. Step 361 clears the memories and sets the registers as an initial process. Steps 363, 365, 366 execute the same processes as steps 331, 333. At steps 362, 364 and 366, however, the number of phases (normally three), the number of coefficients (number of types of protective relays), the number of set values (number of stages) and the like to be processed are applied from an external source, whereby the program is also standardized for the number of phases, the number of a plurality of types of protective relays and the number of stages. These numbers are stepped forward at steps 369, 371 and 373.

The protective relays handled are of five types, including an over-current relay and a short voltage relay indicated by equations (17) and (18) below, in addition to the reactance relay, mho relay and the offset mho relay described with reference to the embodiment shown in FIG. 29.

$$\sum_{n=1}^{N} I^2 > K_4 \quad (17)$$

-continued $$\sum_{n=1}^{N} V^2 > K_5 \quad (18)$$

As explained above, according to the present embodiment, the same computation program may be used to alter and set the coefficients ($k_1$ to $k_5$) thereby to realize any of a reactance relay, a mho relay, an offset mho relay, an over-current relay or a short voltage relay. Also, the floating point arithmetic system, in which the program is not changed to secure the number of significant digits according to the size of the set value, realizes standardization of the software, that is, a program.

The effect of reducing the program capacity will be specifically explained by citing specific examples. A reactance relay having a characteristic shown in FIG. 31A, for example, has six relay elements. If this is processed for three phases, the total number of relay elements processed are eighteen. Further, if the shorting protection and the grounding protection are to be provided, on the other hand, the total number of relay elements are 36. Assuming that this is processed by a conventional system, about 3.6 K steps of computation program are required, one element being 100 steps. According to the present invention, in contrast, the total number of steps is not more than 200 even considering that the number of steps for the standard equation (16) is twice the number for the conventional system, thus saving the program capacity greatly (to about 1/20). As a result, the software productivity is improved and the debugging work is facilitated at the same time.

Although each of the embodiments described above represents a case in which the processing operation based on the standard equation (16) is effected by a digital signal processor DSP of floating point arithmetic type, it is of course possible to use a general-purpose microprocessor or microcomputer if it is of floating point arithmetic type.

Further, the present embodiment has an advantage in the fact that the computation program for the protective relay is fixed and very small, which makes it possible to check the program very frequently, thus realizing a very reliable system.

Also, since the system is configured both easily and in a simple manner, the system cost is reduced.

As described above, the coefficients $k_1$ to $k_5$ relating to the setting of the characteristics of the protective relay may be stored in the data memory (RAM) in the DSP 300 after all with the input settable from the setting panel 55 shown in FIG. 29, for example. An embodiment of the method of setting the input will be explained below.

The setting interface 111 of the system control unit 1 has built therein a nonvolatile memory ($E^2PROM$) normally electrically rewritable to store the set value of the relay, and a set value from the setting panel 55 is written in this memory. By taking advantage of this feature, the coefficients ($k_1$ to $k_5$) are written and set like a set value. The coefficients thus written are transferred to the dual-port data memory 33 of the relay computation unit 3 by the microprocessor (MPU) 100. Then, the DSP 30 reads the coefficients ($k_1$ to $k_5$) from the dual-port data memory 302 and takes them into its own data memory 330 for storing as shown in FIGS. 35 and 37 for computation. As in setting the coefficients ($k_1$ to $k_5$), the number of coefficients or the information on the head address of the coefficients may be applied from the setting panel 55.

In this way, the protective relay system is directly developed from the setting panel. In place of a setting panel, a personal computer may be used to set the coefficients ($k_1$ to $k_5$) or the like, thus making it possible to set or alter the relay characteristics on line.

As will be understood from the foregoing description, according to another embodiment of the present invention, that the computation formulae relating to a plurality of types of protective relays are standardized into a single standard equation, and the characteristic constants for the particular standard equation are variably set. In view of this, a plurality of types of protective relays are realized by a single computation program, thus greatly facilitating the program preparation, while at the same time remarkably reducing the program capacity requirement. As a result, the software productivity is improved, and a low-cost, reliable protective relay system is realized. In addition, the small program capacity assures frequent program checking and monitoring, thereby permitting a maintenance-free operation.

Also, the characteristic constants, including the coefficients, can be set and altered in data form through a setting panel or a personal computer, so that a protective relay of the desired type and characteristics is easily realized. Further, the configuration of the protective relay system is easily developed, modified, checked or otherwise handled, while at the same time making it possible to change the protective relay system and the characteristics thereof on line.

We claim:

1. A digital control and protective system for controlling an operation of at least one protective relay for protecting a power system, said digital control and protective system comprising:

an analog input unit including a digital processor for receiving an analog signal indicative of one of a current and a voltage of the power system, converting the analog signal into a first digital signal and applying a filtering process to said first digital signal to remove high frequency components included in said first digital signal thereby producing a second digital signal, and a memory for storing said second digital signal;

a relay computation unit including a digital signal processor for receiving said second digital signal and processing said second digital signal with a predetermined computation specific to the at least one protective relay thereby producing a processed signal, and a memory for storing said processed signal;

a sequence processing unit including a first microprocessor for receiving said processed signal and comparing said processed signal with a preset value thereby producing a control signal based on a result of said comparison, said control signal being used for issuing a cut-off command for cutting off a circuit breaker of the power system from the at least one protective relay; and a system control unit connected to said analog input unit, said relay computation unit and said sequence processing unit through a system bus and including a master memory and a second microprocessor for controlling transfer of data through said system bus between said system control unit and each of said analog input unit, said relay computation unit and said sequence processing unit so that said second digital signal is transferred from said memory of said analog input unit through the master memory to said relay computation unit and said processed signal is transferred from said memory of said relay computation unit through said master memory to said sequence processing unit.

2. A reactive power compensation system for compensating for a reactive power in a power system by controlling an operation of a semiconductor switch through which a reactive current flows into the power system, said reactive power compensation system, comprising:

an analog input unit including a digital processor for receiving an analog signal indicative of a condition of the power system relating to a reactive power of the power system, converting said analog signal into a first digital signal and applying a filtering process to said first digital signal to remove high frequency components included in said first digital signal thereby producing a second digital signal, and a memory for storing said second digital signal;

a relay computation unit including a digital signal processor for receiving said second digital signal and processing said second digital signal with a predetermined computation thereby producing a processed signal and a memory for storing said processed signal;

a sequence processing unit including a first microprocessor for receiving said processed signal and comparing said processed signal with a preset value thereby producing a control signal based on a result of said comparison, said control signal being used for issuing an on-off command for said semiconductor switch; and a system control unit connected to said analog input unit, said relay computation unit and said sequence processing unit through a system bus and including a master memory and a second microprocessor for controlling transfer of data through said system bus between said system control unit and each of said analog input unit, said relay computation unit and said sequence processing unit so that the second digital signal is transferred from the memory of said analog input unit through said master memory to said relay computation unit and said processed signal is transferred from the memory of said relay computation unit through the master memory to said sequence processing unit.

3. A digital control and protective system for controlling an operation of at least one protective relay for protecting a power system, said digital control and protective system comprising:

an analog input unit including a digital processor for receiving an analog signal indicative of one of a current and a voltage of the power system, converting said analog signal into a first digital signal and applying a filtering process to said first digital signal to remove high frequency components included in said first digital signal thereby producing a second digital signal, and a memory for storing said second digital signal;

a relay computation unit including a digital signal processor for receiving said second digital signal and processing said second digital signal with a predetermined computation specific to said at least one protective relay thereby producing a processed signal, and a memory for storing said processed signal;

a sequence processing unit including a first microprocessor for receiving said processed signal and comparing said processed signal with a preset value thereby producing a control signal based on a result of said comparison, said control signal being used for issuing a cut-off command for cutting off a circuit breaker of the power system from said at least one protective relay;

a system control unit connected to said analog input unit, said relay computation unit and said sequence processing unit through a first bus and including a master memory and a second microprocessor for controlling transfer of data through said first bus between said system control unit and each of said analog input unit, said relay computation unit and said sequence processing unit so that the second digital signal is transferred from said memory of said analog input unit through said master memory to said relay computation unit and said processed signal is transferred from said memory of said relay computation unit through said master memory to said sequency processing unit; and a digital input output unit connected to said sequence processing unit through a second bus for receiving said control signal from said sequence processing unit through said second bus and outputting said control signal to control operation of said at least one protective relay.

4. A digital control and protective system for controlling an operation of at least one protective relay for protecting a power system, said digital control and protective system comprising:

an analog input unit including a digital processor for receiving an analog signal indicative of one of a current and a voltage of the power system and converting the analog signal into a digital signal;

a relay computation unit including a digital signal processor for receiving said digital signal and processing said digital signal with a predetermined computation specific to said at least one protective relay thereby producing a processed signal;

a sequence processing unit including a first microprocessor for receiving said processed signal and judging whether said processed signal satisfies a predetermined condition relating to control of said at least one protective relay thereby producing a control signal based on a result of said judgment, said control signal being used for issuing a cut-off command for cutting off a circuit breaker of the power system from said at least one protective relay; and a system control unit connected to said analog input unit, said relay computation unit and said sequence processing unit through a system bus and including a master memory and a second microprocessor for controlling transfer of data through said system bus between said system control unit and each of said analog input unit, said relay computation unit and said sequence processing unit so that said digital signal is transferred from said analog input unit through said master memory to said relay computation unit and said processed signal is transferred from said relay computation unit through said master memory to said sequence processing unit.

5. A digital control and protective system for controlling an operation of at least one protective relay for protecting a power system, said digital control and protective system comprising:

an analog input unit including a digital processor for receiving an analog signal indicative of one of a current and a voltage of the power system and converting said analog signal into a digital signal, and a memory for storing said digital signal;

a relay computation unit including a digital signal processor for receiving said digital electrical signal and processing said digital electrical signal with a predetermined computation specific to said at least one protective relay thereby producing a processed signal, and a memory for storing said processed signal;

a sequence processing unit including a first microprocessor for receiving said processed electrical signal and judging whether said processed electrical signal satisfies a predetermined condition relating to control of said at least one protective relay thereby producing a control signal based on a result of said judgement, said control signal being used for issuing a cut-off command for cutting off a circuit breaker of the power system from said at least one protective relay; and a system control unit connected to said analog input unit, said relay computation unit and said sequence processing unit through a system bus and including a master memory and a second microprocessor for controlling transfer of data through said system bus between said system control unit and each of said analog input unit, said relay computation unit and said sequence processing unit so that said digital signal stored in said memory of said analog input unit is transferred through said system bus to said master memory to be stored therein and then transferred through said system bus to said relay computation unit, and said processed signal stored in said the memory of said relay computation unit is transferred through said system bus to said master memory to be stored therein and then transferred through said system bus to said sequence processing unit.

* * * * *